(12) United States Patent
Takatomi et al.

(10) Patent No.: US 7,761,822 B2
(45) Date of Patent: Jul. 20, 2010

(54) FILE INFORMATION GENERATING METHOD, FILE INFORMATION GENERATING APPARATUS, AND STORAGE MEDIUM STORING FILE INFORMATION GENERATION PROGRAM

(75) Inventors: Koji Takatomi, Fukuoka (JP); Kouichi Tanda, Fukuoka (JP); Hiroaki Shiraishi, Fukuoka (JP); Yoshikatsu Kouhara, Fukuoka (JP); Takakazu Tokunaga, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 342 days.

(21) Appl. No.: 12/048,668

(22) Filed: Mar. 14, 2008

(65) Prior Publication Data

US 2008/0235530 A1 Sep. 25, 2008

(30) Foreign Application Priority Data

Mar. 19, 2007 (JP) ............................. 2007-071658

(51) Int. Cl.
*G06F 17/50* (2006.01)
(52) U.S. Cl. .................................. 716/4; 716/6; 716/10
(58) Field of Classification Search ...................... 716/1, 716/4, 6, 10
See application file for complete search history.

(56) References Cited

U.S. PATENT DOCUMENTS 6,557,148 B1 * 4/2003 Nishida et al. ................. 716/4

FOREIGN PATENT DOCUMENTS

| EP | 0 851 351 A2 | 7/1998 |
|---|---|---|
| EP | 0 851 351 A3 | 7/1998 |
| JP | 08-006810 | 1/1996 |
| JP | 10-187481 | 7/1998 |
| JP | 2003-087710 | 3/2003 |

* cited by examiner

*Primary Examiner*—Stacy A Whitmore
(74) *Attorney, Agent, or Firm*—Staas & Halsey LLP

(57) ABSTRACT

A method and apparatus for generating file information including setting clock information regarding a clock condition and a clock speed to be used by a speed conversion circuit block, reconstructing the clock circuit block including a new clock for accommodating insertion of the speed conversion circuit block, and associating connection terminal information indicating a connection relationship of connection terminals with speed conversion object information having set, as a speed conversion object, a connection terminal requiring connection speed conversion. The connection terminal information of the connection terminal set as the speed conversion object is extracted, speed conversion circuit information indicating a connection relationship of the connection terminals in the speed conversion circuit block and connection terminal information having the connection relationship of the connection terminals reconstructed is generated, and file information in which the speed conversion circuit block is inserted between the clock circuit block and the interface block is generated.

11 Claims, 19 Drawing Sheets

FIG. 3

| ITEM | SETTING | DEFAULT VALUE |
|---|---|---|
| 1 | SPEED CONVERSION PROGRAM<br>(0: NON-USE, 1: USE) | 0 |
| 2 | CLOCK CONDITION SETTING<br>(0: FAST CLOCK, 1: SLOW CLOCK) | 0 |
| 3 | CLOCK SPEED SETTING<br>0: 1/2 TIMES OR 2 TIMES<br>1: 1/4 TIMES OR 4 TIMES<br>2: 1/8 TIMES OR 8 TIMES | 0 |

FIG. 4

CKG

| ITEM | PORT NAME | RANGE | I/O | TYPE | CLASS | SYNCHRONOUS CLOCK | CONNECTION SOURCE BLOCK | CONNECTION SOURCE PORT NAME | SPEED CONVERSION GROUP |
|---|---|---|---|---|---|---|---|---|---|
| 1 | CLK | 1 | I | S | CLK | - | I/O | CLK | |
| 2 | CLKA | 1 | O | S | CLK | - | | | |
| 3 | CLKB | 1 | O | S | CLK | - | | | |

BLK1

| ITEM | PORT NAME | RANGE | I/O | TYPE | CLASS | SYNCHRONOUS CLOCK | CONNECTION SOURCE BLOCK | CONNECTION SOURCE PORT NAME | SPEED CONVERSION GROUP |
|---|---|---|---|---|---|---|---|---|---|
| 1 | CLKA | 1 | I | S | CLK | - | CKG | CLKA | |
| 2 | CLKB | 1 | I | S | CLK | - | CKG | CLKB | |
| 3 | ODTA | 1 | O | S | DT | CLKB | | | |
| 4 | ODTB | 15:0 | O | V | DT | CLKA | | | 1 |
| 5 | ODTC | 1 | O | S | DT | CLKB | | | |

BLK2

| ITEM | PORT NAME | RANGE | I/O | TYPE | CLASS | SYNCHRONOUS CLOCK | CONNECTION SOURCE BLOCK | CONNECTION SOURCE PORT NAME | SPEED CONVERSION GROUP |
|---|---|---|---|---|---|---|---|---|---|
| 1 | CLKA | 1 | I | S | CLK | - | CKG | CLKA | |
| 2 | CLKB | 1 | I | S | CLK | - | CKG | CLKB | |
| 3 | IDTD | 1 | I | S | DT | CLKB | BLK1 | ODTA | |
| 4 | ODTE | 1 | O | S | DT | CLKA | | | 1 |
| 5 | ODTF | 1 | O | S | DT | CLKB | | | |

BLK3

| ITEM | PORT NAME | RANGE | I/O | TYPE | CLASS | SYNCHRONOUS CLOCK | CONNECTION SOURCE BLOCK | CONNECTION SOURCE PORT NAME | SPEED CONVERSION GROUP |
|---|---|---|---|---|---|---|---|---|---|
| 1 | CLKA | 1 | I | S | CLK | - | CKG | CLKA | |
| 2 | CLKB | 1 | I | S | CLK | - | CKG | CLKB | |
| 3 | IDTG | 1 | I | S | DT | CLKB | BLK2 | ODTF | |
| 4 | IDTH | 1 | I | S | DT | CLKB | BLK1 | ODTC | |
| 5 | ODTI | 1 | O | S | DT | CLKA | | | 1 |

IF

| ITEM | PORT NAME | RANGE | I/O | TYPE | CLASS | SYNCHRONOUS CLOCK | CONNECTION SOURCE BLOCK | CONNECTION SOURCE PORT NAME | SPEED CONVERSION GROUP |
|---|---|---|---|---|---|---|---|---|---|
| 1 | CLKA | 1 | I | S | CLK | - | CKG | CLKA | |
| 2 | OCLKA | 1 | O | S | CLK | - | I/O | OCLKA | |
| 3 | IDTJ | 1 | I | S | DT | CLKA | BLK2 | ODTE | 1 |
| 4 | IDTK | 15:0 | I | V | DT | CLKA | BLK1 | ODTB | 1 |
| 5 | IDTL | 1 | I | S | DT | CLKA | BLK3 | ODTI | 1 |
| 6 | BDTM | 31:0 | IO | V | DT | CLKA | I/O | BDTM | |
| 7 | BDTN | 1 | IO | S | DT | CLKA | I/O | BDTN | |

FIG. 5

CKG

| ITEM | PORT NAME | RANGE | I/O | TYPE | CLASS | SYNCHRONOUS CLOCK | CONNECTION SOURCE BLOCK | CONNECTION SOURCE PORT NAME | SPEED CONVERSION GROUP |
|---|---|---|---|---|---|---|---|---|---|
| 1 | CLK | 1 | I | S | CLK | - | I/O | CLK | |
| 2 | CLKA | 1 | O | S | CLK | - | | | |
| 3 | CLKB | 1 | O | S | CLK | - | | | |
| 4 | CLKC | 1 | O | S | CLK | - | | | |

BLK1

| ITEM | PORT NAME | RANGE | I/O | TYPE | CLASS | SYNCHRONOUS CLOCK | CONNECTION SOURCE BLOCK | CONNECTION SOURCE PORT NAME | SPEED CONVERSION GROUP |
|---|---|---|---|---|---|---|---|---|---|
| 1 | CLKA | 1 | I | S | CLK | - | CKG | CLKA | |
| 2 | CLKB | 1 | I | S | CLK | - | CKG | CLKB | |
| 3 | ODTA | 1 | O | S | DT | CLKB | | | |
| 4 | ODTB | 15:0 | O | V | DT | CLKA | | | 1 |
| 5 | ODTC | 1 | O | S | DT | CLKB | | | |

BLK2

| ITEM | PORT NAME | RANGE | I/O | TYPE | CLASS | SYNCHRONOUS CLOCK | CONNECTION SOURCE BLOCK | CONNECTION SOURCE PORT NAME | SPEED CONVERSION GROUP |
|---|---|---|---|---|---|---|---|---|---|
| 1 | CLKA | 1 | I | S | CLK | - | CKG | CLKA | |
| 2 | CLKB | 1 | I | S | CLK | - | CKG | CLKB | |
| 3 | IDTD | 1 | I | S | DT | CLKB | BLK1 | ODTA | |
| 4 | ODTE | 1 | O | S | DT | CLKA | | | 1 |
| 5 | ODTF | 1 | O | S | DT | CLKB | | | |

BLK3

| ITEM | PORT NAME | RANGE | I/O | TYPE | CLASS | SYNCHRONOUS CLOCK | CONNECTION SOURCE BLOCK | CONNECTION SOURCE PORT NAME | SPEED CONVERSION GROUP |
|---|---|---|---|---|---|---|---|---|---|
| 1 | CLKA | 1 | I | S | CLK | - | CKG | CLKA | |
| 2 | CLKB | 1 | I | S | CLK | - | CKG | CLKB | |
| 3 | IDTG | 1 | I | S | DT | CLKB | BLK2 | ODTF | |
| 4 | IDTH | 1 | I | S | DT | CLKB | BLK1 | ODTC | |
| 5 | ODTI | 1 | O | S | DT | CLKA | | | 1 |

IF

| ITEM | PORT NAME | RANGE | I/O | TYPE | CLASS | SYNCHRONOUS CLOCK | CONNECTION SOURCE BLOCK | CONNECTION SOURCE PORT NAME | SPEED CONVERSION GROUP |
|---|---|---|---|---|---|---|---|---|---|
| 1 | CLKC | 1 | I | S | CLK | - | CKG | CLKC | |
| 2 | OCLKA | 1 | O | S | CLK | - | I/O | OCLKA | |
| 3 | IDTJ | 1 | I | S | DT | CLKC | INS | IDTJ | 1 |
| 4 | IDTK | 15:0 | I | V | DT | CLKC | INS | IDTK | 1 |
| 5 | IDTL | 1 | I | S | DT | CLKC | INS | IDTL | 1 |
| 6 | BDTM | 31:0 | IO | V | DT | CLKC | I/O | BDTM | 1 |
| 7 | BDTN | 1 | IO | S | DT | CLKC | I/O | BDTN | 1 |

INS

| ITEM | PORT NAME | RANGE | I/O | TYPE | CLASS | SYNCHRONOUS CLOCK | CONNECTION SOURCE BLOCK | CONNECTION SOURCE PORT NAME | SPEED CONVERSION GROUP |
|---|---|---|---|---|---|---|---|---|---|
| 1 | CLKA | 1 | I | S | CLK | - | CKG | CLKA | |
| 2 | CLKC | 1 | I | S | CLK | - | CKG | CLKC | |
| 3 | ODTE | 1 | I | S | DT | CLKA | BLK2 | ODTE | 1 |
| 4 | ODTB | 15:0 | I | V | DT | CLKA | BLK1 | ODTB | 1 |
| 5 | ODTI | 1 | I | S | DT | CLKA | BLK3 | ODTI | 1 |
| 6 | IDTJ | 1 | O | S | DT | CLKC | | | 1 |
| 7 | IDTK | 15:0 | O | V | DT | CLKC | | | 1 |
| 8 | IDTL | 1 | O | S | DT | CLKC | | | 1 |

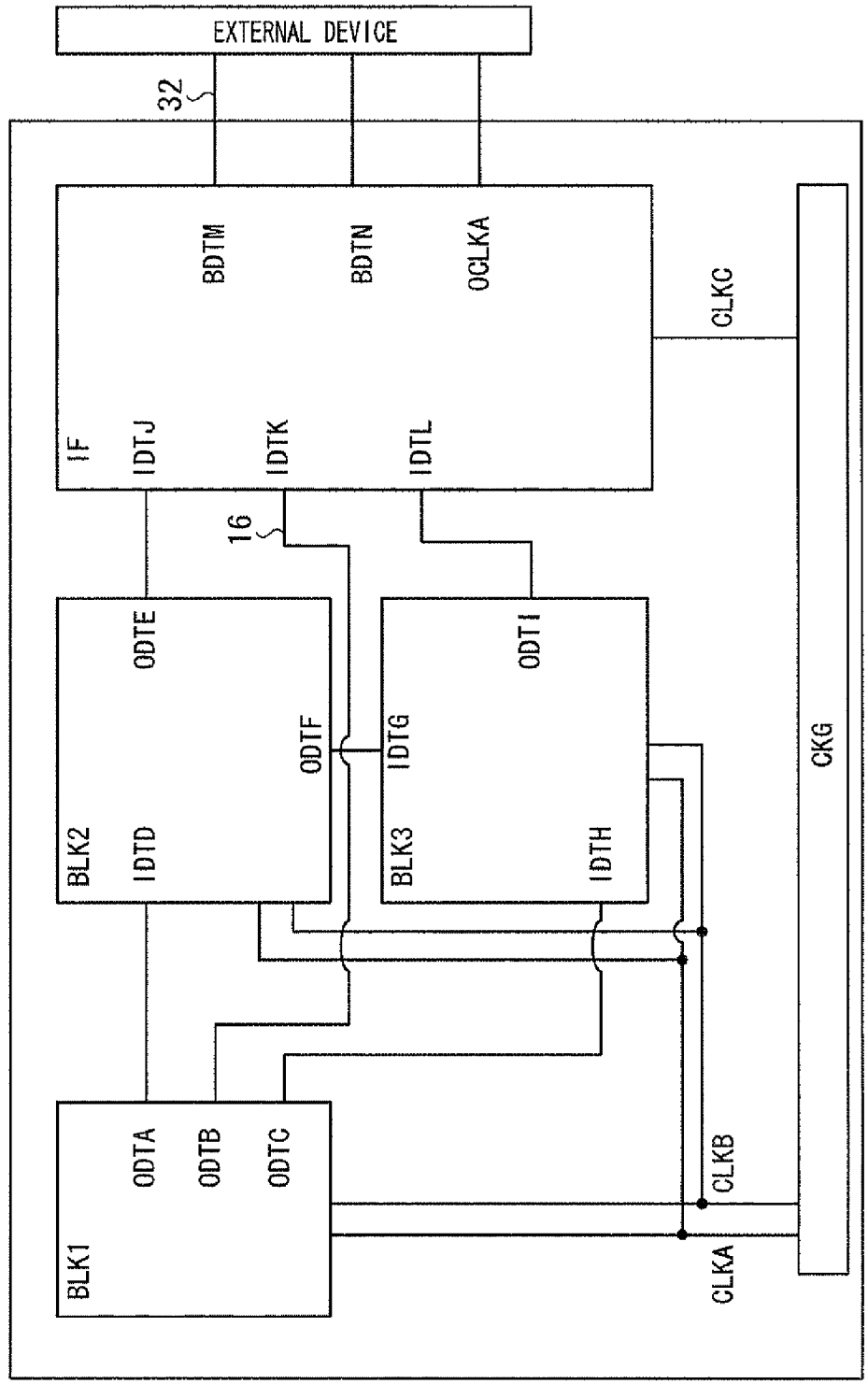

FIG. 9

| PORT NAME | RANGE | I/O | TYPE | CLASS | SYNCHRONOUS CLOCK | CONNECTION SOURCE BLOCK | CONNECTION SOURCE PORT NAME |
|---|---|---|---|---|---|---|---|
| ODTB | 15:0 | O | V | DT | CLKA | | |
| ODTE | 1 | O | S | DT | CLKA | | |
| ODTI | 1 | O | S | DT | CLKA | | |
| IDTJ | 1 | I | S | DT | CLKA | BLK2 | ODTE |
| IDTK | 15:0 | I | V | DT | CLKA | BLK1 | ODTB |
| IDTL | 1 | I | S | DT | CLKA | BLK3 | ODTI |

FIG. 13

| ITEM | SETTING | SETTING VALUE (1) | SETTING VALUE (2) |
|---|---|---|---|
| 1 | SPEED CONVERSION PROGRAM (0: NON-USE, 1: USE) | 1 | 1 |
| 2 | CLOCK CONDITION SETTING (0: FAST CLOCK, 1: SLOW CLOCK) | 0 | 1 |
| 3 | CLOCK SPEED SETTING<br>0: 1/2 TIMES OR 2 TIMES<br>1: 1/4 TIMES OR 4 TIMES<br>2: 1/8 TIMES OR 8 TIMES<br>⋮ | 1 | 1 |

FIG. 15

CKG

| ITEM | PORT NAME | RANGE | I/O | TYPE | CLASS | SYNCHRONOUS CLOCK | CONNECTION SOURCE BLOCK | CONNECTION SOURCE PORT NAME | SPEED CONVERSION GROUP |
|---|---|---|---|---|---|---|---|---|---|
| 1 | CLK | 1 | I | S | CLK | – | I/O | CLK | |
| 2 | CLKA | 1 | O | S | CLK | – | | | |
| 3 | CLKB | 1 | O | S | CLK | – | | | |

BLK1

| ITEM | PORT NAME | RANGE | I/O | TYPE | CLASS | SYNCHRONOUS CLOCK | CONNECTION SOURCE BLOCK | CONNECTION SOURCE PORT NAME | SPEED CONVERSION GROUP |
|---|---|---|---|---|---|---|---|---|---|
| 1 | CLKA | 1 | I | S | CLK | – | CKG | CLKA | |
| 2 | CLKB | 1 | I | S | CLK | – | CKG | CLKB | |
| 3 | ODTA | 1 | O | S | DT | CLKB | | | |
| 4 | ODTB | 15:0 | O | V | DT | CLKA | | | 1 |
| 5 | ODTC | 1 | O | S | DT | CLKB | | | |

BLK2

| ITEM | PORT NAME | RANGE | I/O | TYPE | CLASS | SYNCHRONOUS CLOCK | CONNECTION SOURCE BLOCK | CONNECTION SOURCE PORT NAME | SPEED CONVERSION GROUP |
|---|---|---|---|---|---|---|---|---|---|
| 1 | CLKA | 1 | I | S | CLK | – | CKG | CLKA | |
| 2 | CLKB | 1 | I | S | CLK | – | CKG | CLKB | |
| 3 | IDTD | 1 | I | S | DT | CLKB | BLK1 | ODTA | |
| 4 | ODTE | 1 | O | S | DT | CLKA | | | 1 |
| 5 | ODTF | 1 | O | S | DT | CLKB | | | |

BLK3

| ITEM | PORT NAME | RANGE | I/O | TYPE | CLASS | SYNCHRONOUS CLOCK | CONNECTION SOURCE BLOCK | CONNECTION SOURCE PORT NAME | SPEED CONVERSION GROUP |
|---|---|---|---|---|---|---|---|---|---|
| 1 | CLKA | 1 | I | S | CLK | – | CKG | CLKA | |
| 2 | CLKB | 1 | I | S | CLK | – | CKG | CLKB | |
| 3 | IDTG | 1 | I | S | DT | CLKB | BLK2 | ODTF | |
| 4 | IDTH | 1 | I | S | DT | CLKB | BLK1 | ODTC | |
| 5 | ODTI | 1 | O | S | DT | CLKB | | | 2 |

IF

| ITEM | PORT NAME | RANGE | I/O | TYPE | CLASS | SYNCHRONOUS CLOCK | CONNECTION SOURCE BLOCK | CONNECTION SOURCE PORT NAME | SPEED CONVERSION GROUP |
|---|---|---|---|---|---|---|---|---|---|
| 1 | CLKA | 1 | I | S | CLK | – | CKG | CLKA | |
| 2 | OCLKA | 1 | O | S | CLK | – | I/O | OCLKA | |
| 3 | CLKB | 1 | I | S | DT | – | CKG | CLKA | |
| 4 | OCLKB | 15:0 | O | S | DT | – | I/O | OCLKB | |
| 5 | IDTJ | 1 | I | S | DT | CLKA | BLK2 | ODTE | 1 |
| 6 | IDTK | 15:0 | I | V | DT | CLKA | BLK1 | ODTB | 1 |
| 7 | IDTL | 1 | I | S | DT | CLKB | BLK3 | ODTI | 2 |
| 8 | BDTM | 31:0 | IO | V | DT | CLKA | I/O | BDTM | |
| 9 | BDTN | 1 | IO | S | DT | CLKB | I/O | BDTN | |

FIG. 16

| PORT NAME | RANGE | I/O | TYPE | CLASS | SYNCHRONOUS CLOCK | CONNECTION SOURCE BLOCK | CONNECTION SOURCE PORT NAME |
|---|---|---|---|---|---|---|---|
| ODTB | 15:0 | O | V | DT | CLKA | | |
| ODTE | 1 | O | S | DT | CLKA | | |
| IDTJ | 1 | I | S | DT | CLKA | BLK2 | ODTE |
| IDTK | 15:0 | I | V | DT | CLKA | BLK1 | ODTB |

| PORT NAME | RANGE | I/O | TYPE | CLASS | SYNCHRONOUS CLOCK | CONNECTION SOURCE BLOCK | CONNECTION SOURCE PORT NAME |
|---|---|---|---|---|---|---|---|
| ODTI | 1 | O | S | DT | CLKB | | |
| IDTL | 1 | I | S | DT | CLKB | BLK3 | ODTI |

FIG. 17

CKG

| ITEM | PORT NAME | RANGE | I/O | TYPE | CLASS | SYNCHRONOUS CLOCK | CONNECTION SOURCE BLOCK | CONNECTION SOURCE PORT NAME | SPEED CONVERSION GROUP |
|---|---|---|---|---|---|---|---|---|---|
| 1 | CLK | 1 | I | S | CLK | – | I/O | CLK | |
| 2 | CLKA | 1 | O | S | CLK | – | | | |
| 3 | CLKB | 1 | O | S | CLK | – | | | |
| 4 | CLKC | 1 | O | S | CLK | – | | | |
| 5 | CLKD | 1 | O | S | CLK | – | | | |

BLK1

| ITEM | PORT NAME | RANGE | I/O | TYPE | CLASS | SYNCHRONOUS CLOCK | CONNECTION SOURCE BLOCK | CONNECTION SOURCE PORT NAME | SPEED CONVERSION GROUP |
|---|---|---|---|---|---|---|---|---|---|
| 1 | CLKA | 1 | I | S | CLK | – | CKG | CLKA | |
| 2 | CLKB | 1 | I | S | CLK | – | CKG | CLKB | |
| 3 | ODTA | 1 | O | S | DT | CLKB | | | |
| 4 | ODTB | 15:0 | O | V | DT | CLKA | | | 1 |
| 5 | ODTC | 1 | O | S | DT | CLKB | | | |

BLK2

| ITEM | PORT NAME | RANGE | I/O | TYPE | CLASS | SYNCHRONOUS CLOCK | CONNECTION SOURCE BLOCK | CONNECTION SOURCE PORT NAME | SPEED CONVERSION GROUP |
|---|---|---|---|---|---|---|---|---|---|
| 1 | CLKA | 1 | I | S | CLK | – | CKG | CLKA | |
| 2 | CLKB | 1 | I | S | CLK | – | CKG | CLKB | |
| 3 | IDTD | 1 | I | S | DT | CLKB | BLK1 | ODTA | |
| 4 | ODTE | 1 | O | S | DT | CLKA | | | 1 |
| 5 | ODTF | 1 | O | S | DT | CLKB | | | |

BLK3

| ITEM | PORT NAME | RANGE | I/O | TYPE | CLASS | SYNCHRONOUS CLOCK | CONNECTION SOURCE BLOCK | CONNECTION SOURCE PORT NAME | SPEED CONVERSION GROUP |
|---|---|---|---|---|---|---|---|---|---|
| 1 | CLKA | 1 | I | S | CLK | – | CKG | CLKA | |
| 2 | CLKB | 1 | I | S | CLK | – | CKG | CLKB | |
| 3 | IDTG | 1 | I | S | DT | CLKB | BLK2 | ODTF | |
| 4 | IDTH | 1 | I | S | DT | CLKB | BLK1 | ODTC | |
| 5 | ODTI | 1 | O | S | DT | CLKB | | | 2 |

IF

| ITEM | PORT NAME | RANGE | I/O | TYPE | CLASS | SYNCHRONOUS CLOCK | CONNECTION SOURCE BLOCK | CONNECTION SOURCE PORT NAME | SPEED CONVERSION GROUP |
|---|---|---|---|---|---|---|---|---|---|
| 1 | CLKC | 1 | I | S | CLK | – | CKG | CLKC | |
| 2 | OCLKA | 1 | O | S | CLK | – | I/O | OCLKA | |
| 3 | CLKD | 1 | I | S | CLK | – | CKG | CLKD | |
| 4 | OCLKB | 1 | O | S | CLK | – | I/O | OCLKB | |
| 5 | IDTJ | 1 | I | S | DT | CLKC | INS1 | IDTJ | 1 |
| 6 | IDTK | 15:0 | I | V | DT | CLKC | INS1 | IDTK | 1 |
| 7 | IDTL | 1 | I | S | DT | CLKD | INS2 | IDTL | 2 |
| 6 | BDTM | 31:0 | IO | V | DT | CLKC | I/O | BDTM | 1 |
| 7 | BDTN | 1 | IO | S | DT | CLKD | I/O | BDTN | 2 |

INS1

| ITEM | PORT NAME | RANGE | I/O | TYPE | CLASS | SYNCHRONOUS CLOCK | CONNECTION SOURCE BLOCK | CONNECTION SOURCE PORT NAME | SPEED CONVERSION GROUP |
|---|---|---|---|---|---|---|---|---|---|
| 1 | CLKA | 1 | I | S | CLK | – | CKG | CLKA | |
| 2 | CLKC | 1 | I | S | CLK | – | CKG | CLKC | |
| 3 | ODTE | 1 | I | S | DT | CLKA | BLK2 | ODTE | 1 |
| 4 | ODTB | 15:0 | I | V | DT | CLKA | BLK1 | ODTB | 1 |
| 5 | IDTJ | 1 | O | S | DT | CLKC | | | 1 |
| 6 | IDTK | 15:0 | O | V | DT | CLKC | | | 1 |

INS2

| ITEM | PORT NAME | RANGE | I/O | TYPE | CLASS | SYNCHRONOUS CLOCK | CONNECTION SOURCE BLOCK | CONNECTION SOURCE PORT NAME | SPEED CONVERSION GROUP |
|---|---|---|---|---|---|---|---|---|---|
| 1 | CLKB | 1 | I | S | CLK | – | CKG | CLKB | |
| 2 | CLKD | 1 | I | S | CLK | – | CKG | CLKD | |
| 3 | CDLKD | 1 | O | S | CLK | – | | | |
| 4 | ODTI | 1 | I | S | DT | CLKB | BLK3 | ODTI | 2 |
| 5 | IDTL | 1 | O | S | DT | CLKD | | | 2 |

FILE INFORMATION GENERATING METHOD, FILE INFORMATION GENERATING APPARATUS, AND STORAGE MEDIUM STORING FILE INFORMATION GENERATION PROGRAM

CROSS-REFERENCE TO RELATED APPLICATIONS

This application is related to and claims priority to Japanese patent application no. 2007-71658_filed on Mar. 19, 2007 in the Japan Patent Office, and incorporated by reference herein.

BACKGROUND

1. Technical Field

The present invention relates to file information generating method and apparatus that generates file information described in RTL (Register Transfer Level) which includes an interface block at least connected to an external device block, a speed conversion circuit block to be inserted between the interface block and a clock circuit block, and a functional circuit block.

2. Description of the Related Art

In recent years, a method has been developed for performing real-life evaluations through software simulation in order to ensure quality of integrated circuits that are becoming bigger and faster due to technological advancement. In this case, integrated circuits refer to an ASIC (Application Specific Integrated Circuit) and the like.

On the other hand, there is also a method that performs ASIC real-life evaluation without employing software simulation, such as that described in Japanese Patent Laid-Open No. 8-6810. This method performs real-life evaluation by establishing a prototype system of an ASIC equipped with a programmable device such as an FPGA (Field Programmable Gate Array). Recently, this method is becoming the mainstream.

This prototype system is generally established based on a file generated by a circuit engineer using RTL (Register Transfer Level) description. With this method where ASIC real-life evaluation is performed using a prototype system, when an internal speed of the programmable device differs from a speed of connection between an external device, a speed conversion circuit or the like is provided which is designed, for each development of a prototype system, based on the specifications of both the programmable device and the external device.

SUMMARY

The disclosed apparatus includes a speed conversion circuit block provided between an interface block to be connected to an external device block and a clock circuit block, a clock information setting unit that sets clock information regarding a clock condition and a clock speed to be used by the speed conversion circuit block, and a clock circuit block reconstruction unit that reconstructs the clock circuit block including a new clock for accommodating insertion of the speed conversion circuit block based on the clock information set by the clock information setting unit.

The disclosed apparatus and method associate and stores connection terminal information indicating a connection relationship of connection terminals in a circuit structure with speed conversion object information having set, as a speed conversion object, a connection terminal requiring connection speed conversion in response to the insertion of the speed conversion circuit block, extracts, based on the speed conversion object information stored, connection terminal information of the connection terminal set as the speed conversion object and generates speed conversion circuit information indicating a connection relationship of connection terminals in the speed conversion circuit block using the connection terminal information extracted.

The disclosed apparatus and method includes generating connection terminal information in which a connection relationship of the connection terminals in a circuit structure is reconstructed based on speed conversion circuit information generated, and generating file information in which the speed conversion circuit block is inserted between the clock circuit block reconstructed and the interface block based on the connection terminal information generated by reconstructing the connection relationship of the connection terminals in the circuit structure.

BRIEF DESCRIPTION OF THE DRAWINGS

These and/or other aspects and advantages will become apparent and more readily appreciated from the following description of the embodiments, taken in conjunction with the accompanying drawings of which:

FIG. 3 is a diagram illustrating a configuration e of a speed setting file;

FIG. 4 is a diagram illustrating a configuration of a pin information file prior to insertion of a speed conversion circuit block;

FIG. 5 is a diagram illustrating a configuration of a pin information file after insertion of a speed conversion circuit block;

FIG. 6 is a diagram illustrating a configuration of an RTL prior to insertion of a speed conversion circuit block;

FIG. 9 is a diagram illustrating a configuration e of a speed conversion circuit database;

FIG. 13 is a diagram illustrating a configuration of a speed setting file;

FIG. 15 is a diagram illustrating a configuration of a pin information file prior to insertion of a speed conversion circuit block;

FIG. 16 is a diagram illustrating a configuration of a speed conversion circuit database;

FIG. 17 is a diagram illustrating a configuration of a pin information file after insertion of a speed conversion circuit block;

DETAILED DESCRIPTION OF THE EMBODIMENTS

Figure 1:
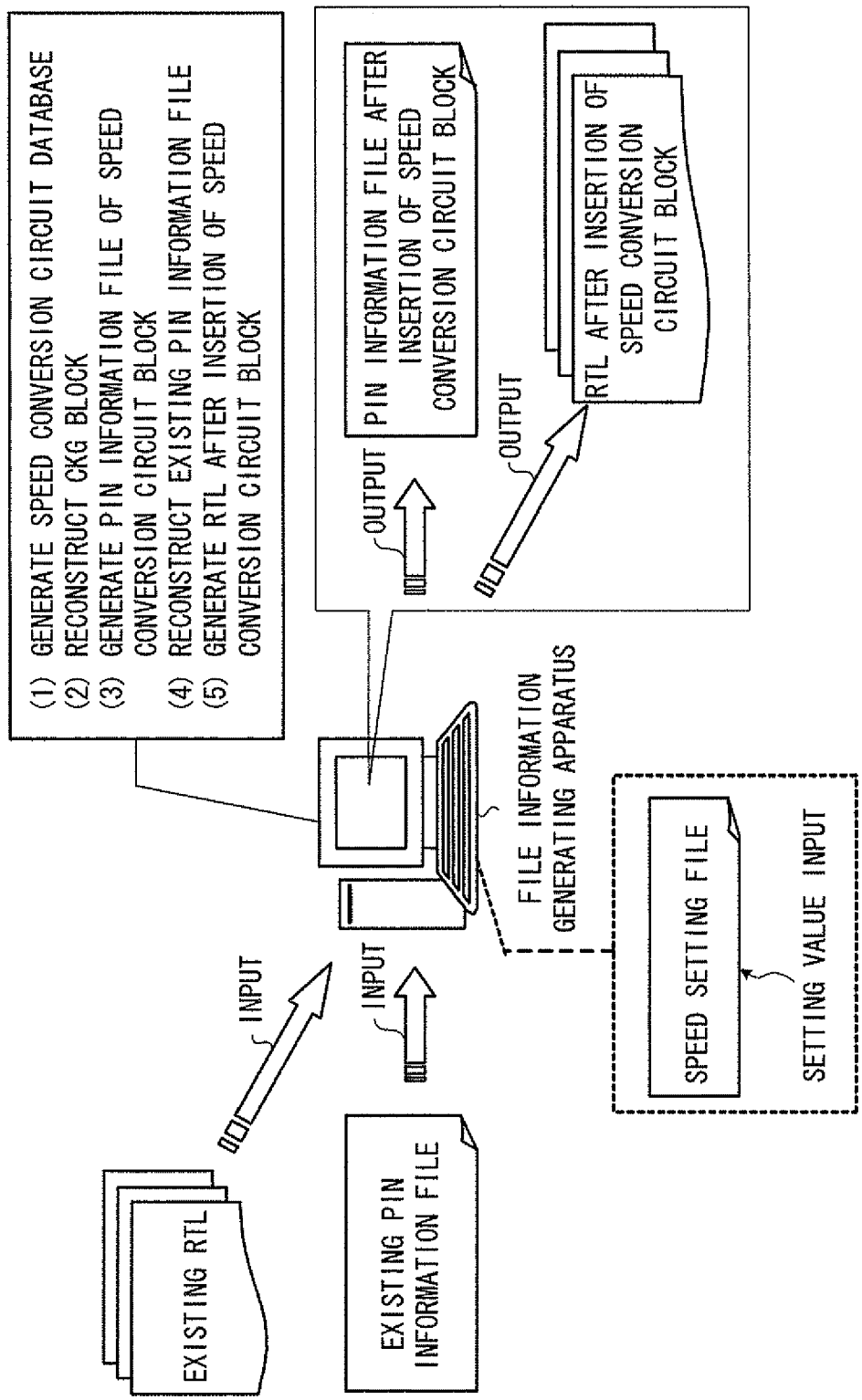
FIG. 1 is a diagram illustrating an outline and characteristics of a file information generating apparatus.

Reference will now be made in detail to the embodiments, examples of which are illustrated in the accompanying drawings, wherein like reference numerals refer to the like elements throughout. The embodiments are described below to explain the present invention by referring to the figures.

A detailed description on the disclosed file information generating method and apparatus is provided herein with reference to the attached drawings. Below, a file information generating apparatus to which is applied a program that generates file information according to the present invention will be taken as an example and described as an embodiment. Subsequently, other embodiments included in the present invention will be described.

Outline and Characteristics of a File Information Generating Apparatus (is Described herein First, an outline and characteristics of a file information generating apparatus according to an embodiment will be described with reference to FIG. 1. FIG. 1 is a diagram of an outline and characteristics of an information generating apparatus according to an embodiment.

The file information generating apparatus generates file information that is an RTL description of a circuit structure including an interface block, a speed conversion circuit block and a functional circuit block. The interface block is at least connected to an external device block. The speed conversion circuit block is to be inserted between the interface block and a clock circuit block. One feature of the file information generating apparatus is that file information described in RTL including the speed conversion circuit block can be readily generated without requiring significant workload in each process and without requiring occurrence of backtracking due to connection error and the like.

A specific description on this primary feature will be given below. As shown in FIG. 1, the file information generating apparatus according to an embodiment accepts (receives) input of an existing RTL and an existing pin information file (i.e., an RTL and a pin information file prior to insertion of a speed conversion circuit block) from a user, and stores information received in the apparatus. The file information generating apparatus also stores a speed setting file for which an input of a setting value from the user was accepted in the apparatus.

The RTL according to an embodiment is a file which describes a circuit structure in Register Transfer Level description. In addition, the pin information file is a file storing information indicating a connection relationship of connection terminals in the respective blocks (e.g., an interface block, a clock circuit block, a functional circuit block or the like) constituting an RTL. The pin information file associates and stores connection terminal information indicating a connection relationship of connection terminals in the circuit structure with information in which is set, as a speed conversion group, connection terminals requiring connection speed conversion in response to the insertion of a speed conversion circuit block. Furthermore, the speed setting file is a file for storing setting value(s) related to a clock condition and a clock speed used in the speed conversion circuit block. In this case, setting values to be stored are those for which input from the user has been accepted.

The file information generating apparatus according to this embodiment generates a speed conversion circuit database (refer to reference numeral (1) in FIG. 1). More specifically, the file information generating apparatus according to an embodiment extracts connection terminal information of a connection terminal that is set as a speed conversion group from a pin information file. Then, using the extracted connection terminal information, the file information generating apparatus generates a speed conversion circuit database indicating a connection relationship of connection terminals in the speed conversion circuit block.

Furthermore, with the file information generating apparatus according to an embodiment, the speed conversion circuit block is inserted between the interface block and the clock circuit block (hereinafter referred to as "CKG block" where appropriate). Accordingly, the CKG block is reconstructed (refer to reference numeral (2) in FIG. 1). More specifically, the file information generating apparatus according to this embodiment adds a new connection terminal in response to the insertion of the speed conversion circuit block. Together with this addition, the file information generating apparatus generates a new clock corresponding to setting values regarding the clock condition and the clock speed inputted to the speed setting file, and reconstructs the CKG block.

Moreover, the file information generating apparatus generates a pin information file of the speed conversion circuit block based on the speed conversion circuit database (refer to reference numeral (3) in FIG. 1). More specifically, the file information generating apparatus reverses input/output directions in the speed conversion circuit database and adds a connection terminal that is the same as a synchronous clock in the speed conversion circuit database. Together with this addition, the file information generating apparatus generates a pin information file of the speed conversion circuit block by adding a connection terminal newly added to the CKG block.

After generating the pin information file of the speed conversion circuit block, the file information generating apparatus reconstructs the pin information file prior to insertion of the speed conversion circuit block (refer to reference numeral (4) in FIG. 1). More specifically, the file information generating apparatus changes the connection terminal heretofore connected to the interface block to the connection terminal newly added to the CKG block by referencing the generated pin information file of the speed conversion circuit block. Together with this change, the file information generating apparatus changes the last connection source of the interface block to the speed conversion block.

Next, the file information generating apparatus generates an RTL after insertion of the speed conversion circuit block (refer to reference numeral (5) in FIG. 1). More specifically, the file information generating apparatus generates an RTL in which the speed conversion circuit block is inserted between the interface block and the reconstructed CKG block based on the pin information file of the speed conversion circuit and the reconstructed pin information file prior to the insertion of the speed conversion circuit block. Subsequently, the generated RTL is stored in the apparatus.

After the generation of the RTL, the file information generating apparatus according to an embodiment outputs the RTL after insertion of the speed conversion circuit block and the pin information file after insertion of the speed conversion circuit block.

As described above, the disclosed file information generating apparatus does not require significant workload in each process. In addition, it is possible to readily generate file information described in RTL including a speed conversion circuit block without requiring occurrence(s) of backtracking due to connection error(s) and the like.

Figure 2:
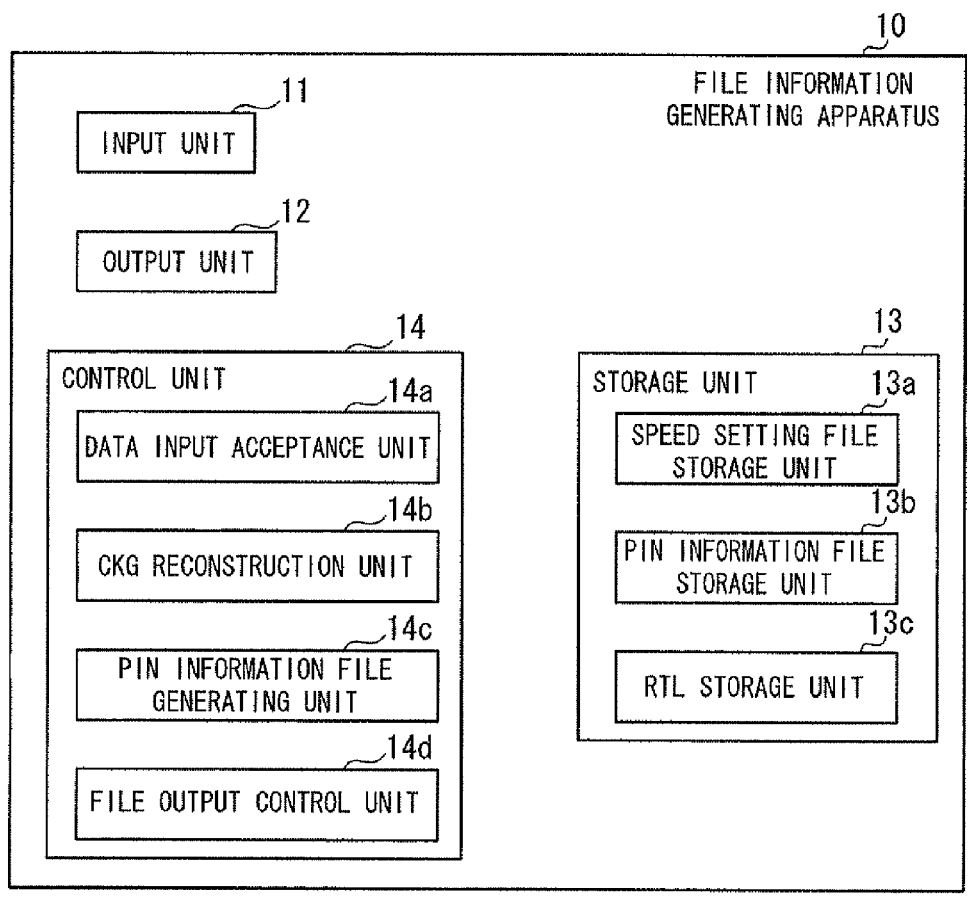
FIG. 2 is a block diagram illustrating a configuration of a file information generating apparatus.
Figure 7:
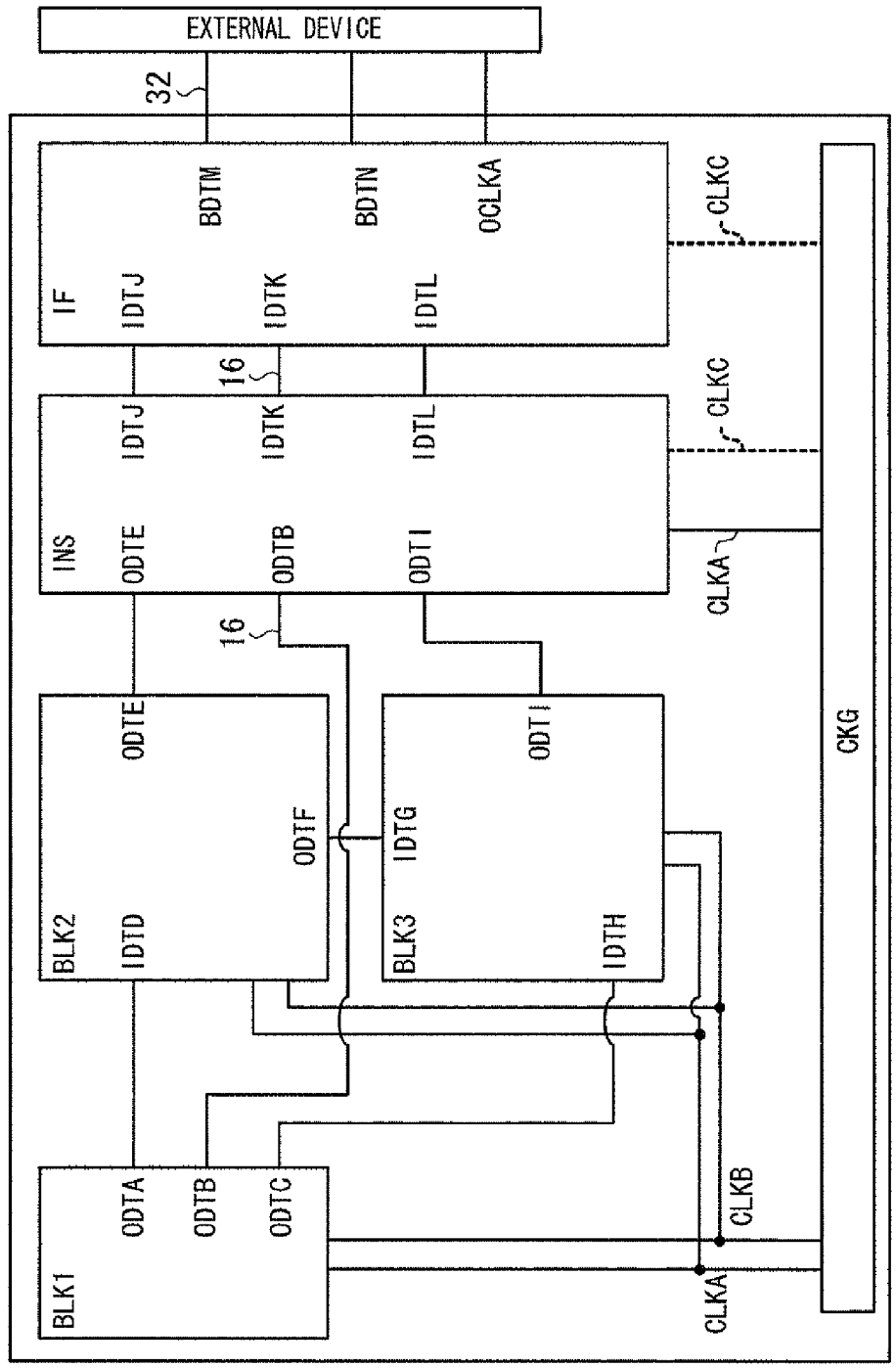
FIG. 7 is a diagram illustrating a configuration of an RTL after insertion of a speed conversion circuit block.
Figure 8:
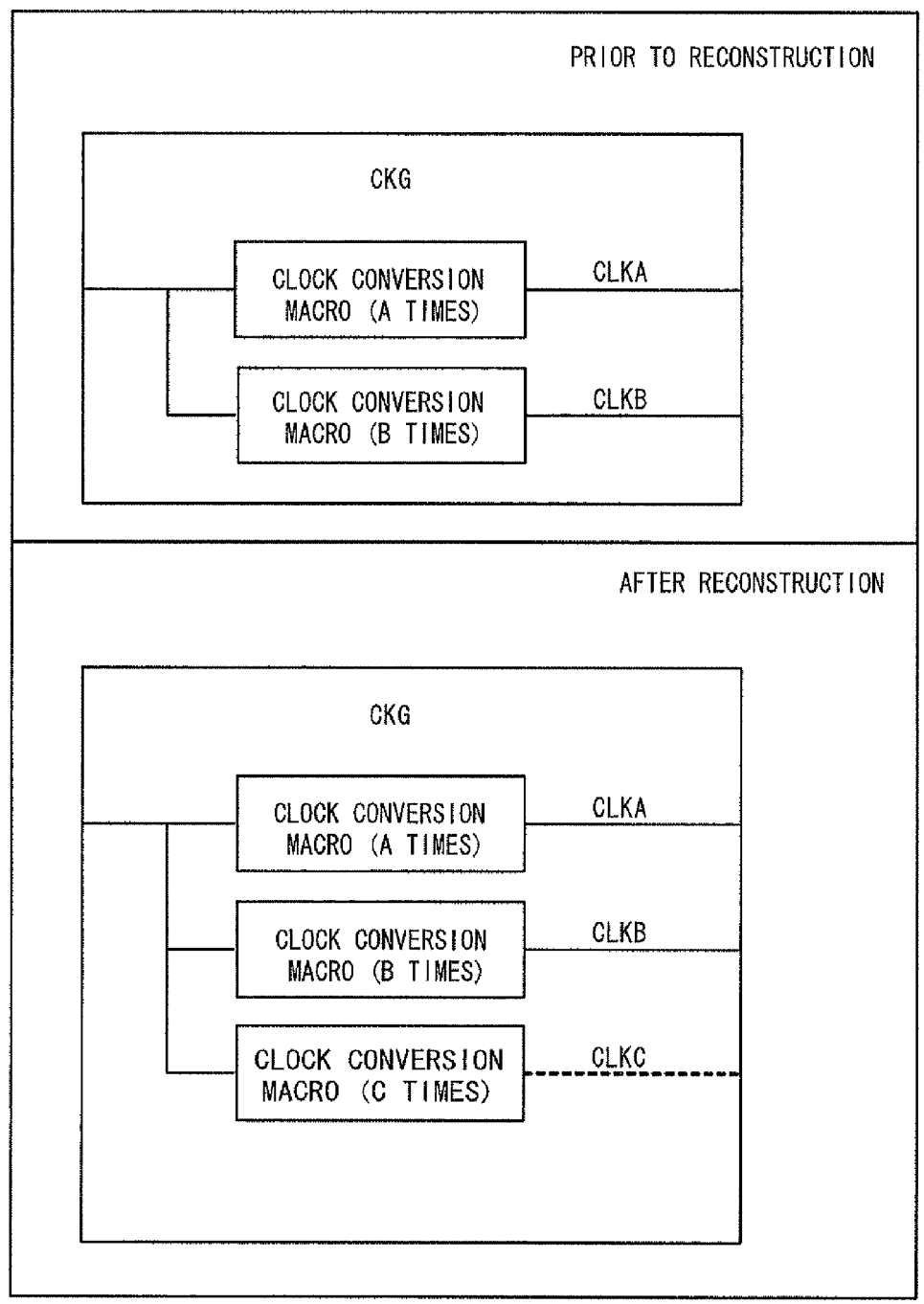
FIG. 8 is a diagram illustrating a reconstructed CKG.

Next, a configuration of the file information generating apparatus will be described with reference to FIGS. 2 to 9. FIG. 2 is a block diagram showing a configuration of a file information generating apparatus. FIG. 3 is a diagram showing a configuration example of a speed setting file according to an embodiment. FIG. 4 is a diagram showing a configuration example of a pin information file prior to insertion of a speed conversion circuit block according to an embodiment. FIG. 5 is a diagram showing a configuration example of a pin information file after insertion of the speed conversion circuit block according to an embodiment. FIG. 6 is a diagram showing a configuration example of an RTL prior to insertion of the speed conversion circuit block according to an embodiment. FIG. 7 is a diagram showing a configuration example of an RTL after insertion of the speed conversion circuit block. FIG. 8 is a diagram showing a reconstruction example of a CKG according to an embodiment. FIG. 9 is a diagram showing a configuration example of a speed conversion circuit database according to an embodiment. Note that, in FIG. 2, only primary processing units necessary for describing the file information generating apparatus according to an embodiment are shown and that descriptions of other processing units have been omitted.

As shown in FIG. 2, a file information generating apparatus 10 may comprise an input unit 11, an output unit 12, a storage unit 13 and a control unit 14.

The input unit 11 is enabled to accept or receive input of various information. The input unit may be constituted by a keyboard, a mouse, a microphone or the like. For example, a user inputs a setting value of a speed setting file via the input unit 11.

The output unit 12 is enabled to output various information and may be constituted by a monitor (or a display or touch panel), or a speaker etc. For example, in addition to displaying/outputting an RTL and a final result file, a speed setting file is also displayed/outputted.

The storage unit 13 is stores data and program(s) necessary for various processing performed by the control unit 14. In particular, as units associated with the present invention, the storage unit 13 includes a speed setting file storage unit 13a, a pin information file storage unit 13b and an RTL storage unit 13c.

Among these units, the speed setting file storage unit 13a is a storage unit for storing file(s) describing setting value(s) related to a clock condition and a clock speed used at the speed conversion circuit block. More specifically as shown in FIG. 3, setting values for which input thereof from the user is accepted are stored in association with respective setting items such as clock condition and clock speed. FIG. 3 depicts a case where a setting value of a speed setting file is a default value. For example, it is assumed that the setting value is: "1" when a speed conversion program is used; "0" when the speed conversion program is not used; "0" when a clock condition is for a fast clock; "1" when the clock condition is for a slow clock; "0" when the clock condition (clock speed setting) is ½ times or 2 times; "1" when the clock condition (clock speed setting) is ¼ times or 4 times; and "2" when the clock condition (clock speed setting) is ⅛ times or 8 times. Such a setting value is accepted from the user and stored. The speed setting file storage unit 13a stores in advance a speed setting file for which a default value has been inputted.

The pin information file storage unit 13b is a storage unit that stores files describing information indicating a connection relationship of connection terminals in respective blocks (e.g., an interface block, a clock circuit block, a functional circuit block or the like) constituting an RTL. More specifically, as shown in FIGS. 4 and 5, the storage unit associates and stores connection terminal information indicating a connection relationship of connection terminals in the circuit structure with information in which is set, as a speed conversion group, connection terminals requiring connection speed conversion in response to the insertion of a speed conversion circuit block. Note that FIG. 4 is a diagram indicating information prior to insertion of the speed conversion circuit block and FIG. 5 is a diagram indicating information after insertion of the speed conversion circuit block. The pin information file storage unit 13b accepts input from the user, and stores, in advance, pin information file prior to the insertion of the speed conversion circuit block.

In this case, "Port name" is information regarding names (or identifiers) of connection terminals within each block. "range" is information on a bit width of inputted or outputted signals. For example, "15:0" indicates a bit width of 16 bits. "I/O" is information indicating whether a connection terminal is an input terminal or an output terminal. "type" is information determining whether the "range" field is to be verified or not. For example, when "type" is "V", the "range" field is referenced and a range width corresponding thereto is verified. "Class" is information for verifying whether the inputted or outputted signal is a synchronizing signal or a data signal. "Synchronous clock" is information indicating a synchronous clock type. "Connection source block" is information indicating a connection source block of a connection terminal described in the "Port name" field. "Connection source port name" is information indicating a name of a connection terminal of a connection source block to which the connection terminal described in the "Port name" field is connected. "Speed conversion group" is information indicating that a user has set a connection terminal requiring connection speed conversion in response to the insertion of the speed conversion circuit block. For instance, a setting of "1" in the "Speed conversion group" field indicates a connection terminal that requires speed conversion.

The RTL storage unit 13c is a storage unit that stores a file which describes a circuit structure using RTL (Register Transfer Level) description. Examples of the storage unit are shown in FIG. 6 (prior to insertion of the speed conversion circuit block) and FIG. 7 (after insertion of the speed conversion circuit block). The storage unit stores a file describing a circuit structure including an interface block (e.g., "IF") at least connected to an external device block, a speed conversion circuit block (e.g., "INS") inserted between the interface block and a clock circuit block (e.g., "CKG"), and respective functional circuits (e.g., "BLK1" to "BLK3"). The RTL storage unit 13c accepts (receives) input from the user, and stores, in advance, an RTL prior to the insertion of the speed conversion circuit block.

The control unit 14 includes control program(s) such as an OS (Operating System) and an internal memory for storing programs specifying various processing procedure(s) and necessary data. The control unit 14 executes various processing using these programs and the internal memory. The control unit 14 as shown in FIG. 2 may comprise a data input acceptance unit 14a, a CKG reconstruction unit 14b, a pin information file generating unit 14c and a file output control unit 14d.

The data input acceptance unit 14a is an input unit that accepts or receives input of various data. A specific description of processing performed by the data input acceptance unit 14a is given below. When an input of a pin information file prior to insertion of the speed conversion circuit block or an RTL prior to insertion of the speed conversion circuit block from the user is accepted via the input unit 11, the data input acceptance unit 14a stands by to accept a request for a setting value input to the speed setting file. Then, when a request for inputting a setting value to the speed setting file is accepted from the user, the data input acceptance unit 14a reads the speed setting file from the speed setting file storage unit 13a and outputs/displays the same to the output unit 12. After outputting/displaying the speed setting file, when an input of a setting value to the speed setting file from the user is accepted, the speed setting file for which the setting value has been inputted is stored in the speed setting file storage unit 13a. In addition to storage in the speed setting file storage unit 13a, the speed setting file is also stored in the pin information file storage unit 13b or the RTL storage unit 13c.

The CKG reconstruction unit 14b reconstructs the CKG block in association with the insertion of the speed conversion circuit block. More specifically, the CKG reconstruction unit 14b reads a speed setting file from the speed setting file storage unit 13a. The CKG reconstruction unit 14b then adds a new connection terminal in response to the insertion of the speed conversion circuit block. Together with the addition, the CKG reconstruction unit 14b generates a new clock corresponding to a setting value related to the clock condition and clock speed inputted to the speed conversion file (refer to FIG. 8) and reconstructs the CKG block.

The pin information file generating unit 14c generates a pin information file of the speed conversion circuit block and reconstructs the pin information file prior to the insertion of the speed conversion circuit block. A specific description of the generation of the pin information file of the speed conversion circuit block is given below. First, the pin information file generating unit 14c extracts connection terminal information of a connection terminal set as a speed conversion group from the pin information file storage unit 13b. The pin information file generating unit 14c uses the extracted connection terminal information to generate a speed conversion circuit database indicating a connection relationship of connection terminals in the speed conversion circuit block (refer to FIG. 9).

Next, based on the generated speed conversion circuit database, the pin information file generating unit 14c generates a pin information file of the speed conversion circuit block. First, the input and output directions in the speed conversion circuit database is reversed and a connection terminal that is the same as the synchronous clock in the speed conversion circuit database is added. Together with the addition, the pin information file generating unit 14c generates a pin information file of the speed conversion circuit block by adding a connection terminal (e.g., "CLKC") that is newly added to the CKG block (refer to FIG. 5).

Next, a specific description of the reconstruction of the pin information file prior to the insertion of the speed conversion circuit block is given. The pin information file generating unit 14c reconstructs the pin information file prior to the insertion of the speed conversion circuit block, which is stored in the pin information file storage unit 13b, while referencing the generated pin information file of the speed conversion circuit block. More specifically, a connection terminal heretofore connected to an interface block (e.g., "IF") is changed to a connection terminal (e.g., "CLKC") that is newly added to the CKG block. Together with this change, a last connection source of the interface block is changed to a speed conversion block (refer to FIG. 5). Subsequently, the pin information file generating unit 14c stores each generated pin information file into the pin information file storage unit 13b.

The file output control unit 14d generates an RTL after the insertion of the speed conversion circuit block and controls output of processing result data. A specific description is given. The file output control unit 14d generates an RTL in which the speed conversion circuit block is inserted between the interface block and the CKG block reconstructed by the CKG reconstruction unit 14b based on the pin information file of the speed conversion circuit generated by the pin information file generating unit 14c and the pin information file prior to the insertion of the speed conversion circuit block which is reconstructed by the pin information file generating unit 14c (refer to FIG. 7). Subsequently, the RTL is stored in the RTL storage unit 14c. The file output control unit 14d outputs/displays the RTL after insertion of the speed conversion circuit block which is stored in the RTL storage unit 14c, the pin information file of the speed conversion circuit block which is stored in the pin information file storage unit 14b and the reconstructed pin information file prior to the insertion of the speed conversion circuit block as processing result data from the output unit 12.

It should be noted that the file information generating apparatus 10 (FIG. 1) may also be realized by providing respective functions described above onto an information processing apparatus such as a known personal computer, a workstation or the like.

Processing Performed by the File Information Generating Apparatus.

Figure 10:
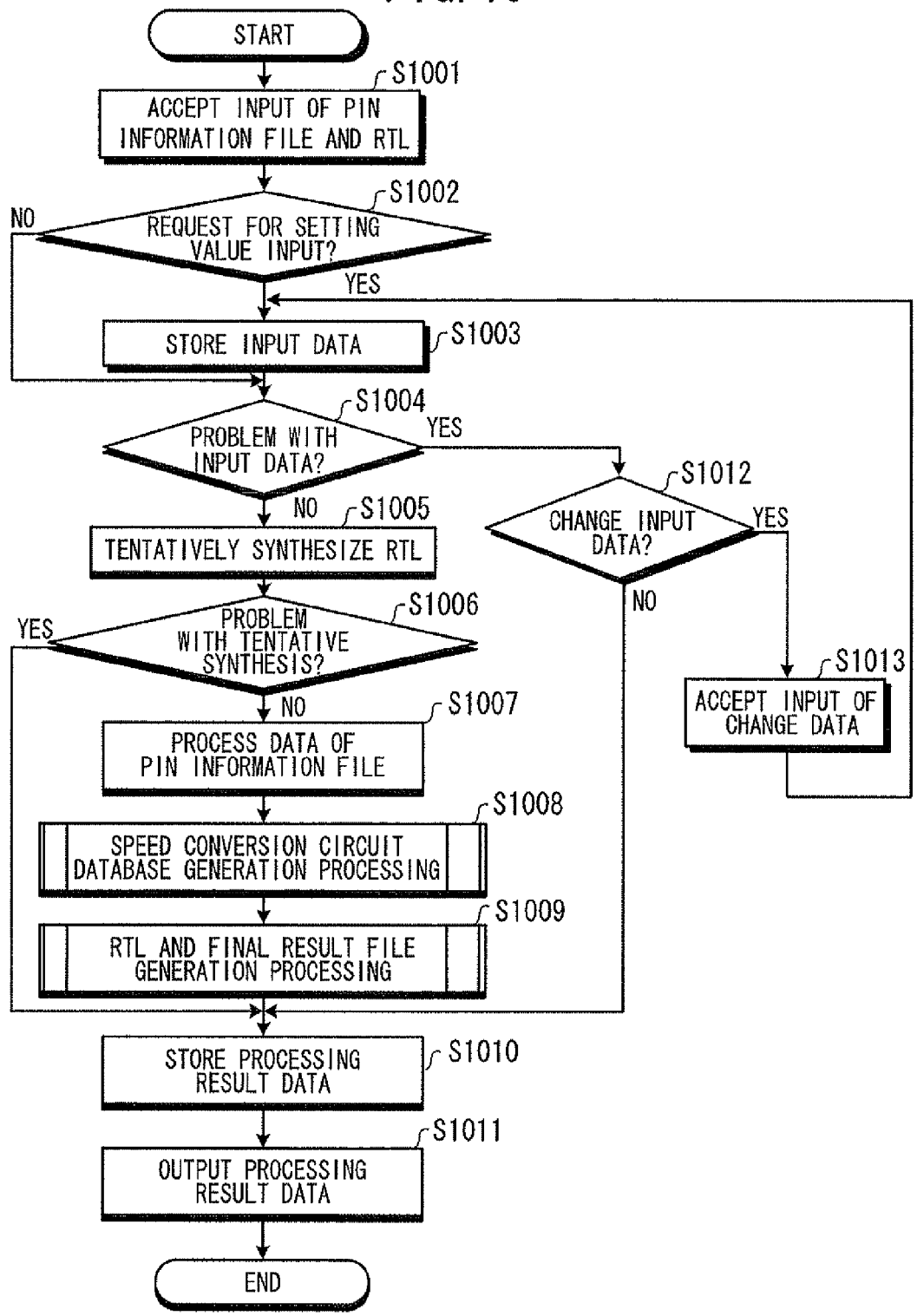
FIG. 10 is a flowchart illustrating a main processing flow.
Figure 11:
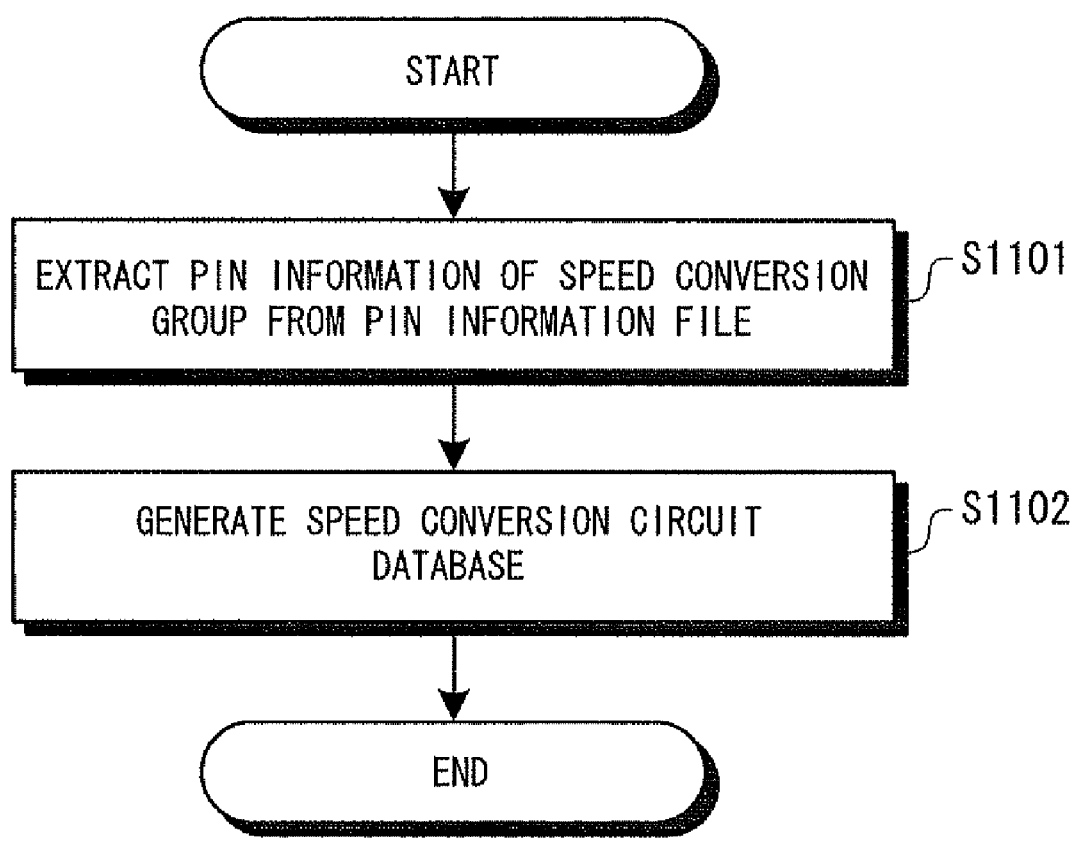
FIG. 11 is a flowchart illustrating a flow of speed conversion circuit database generation processing.
Figure 12:
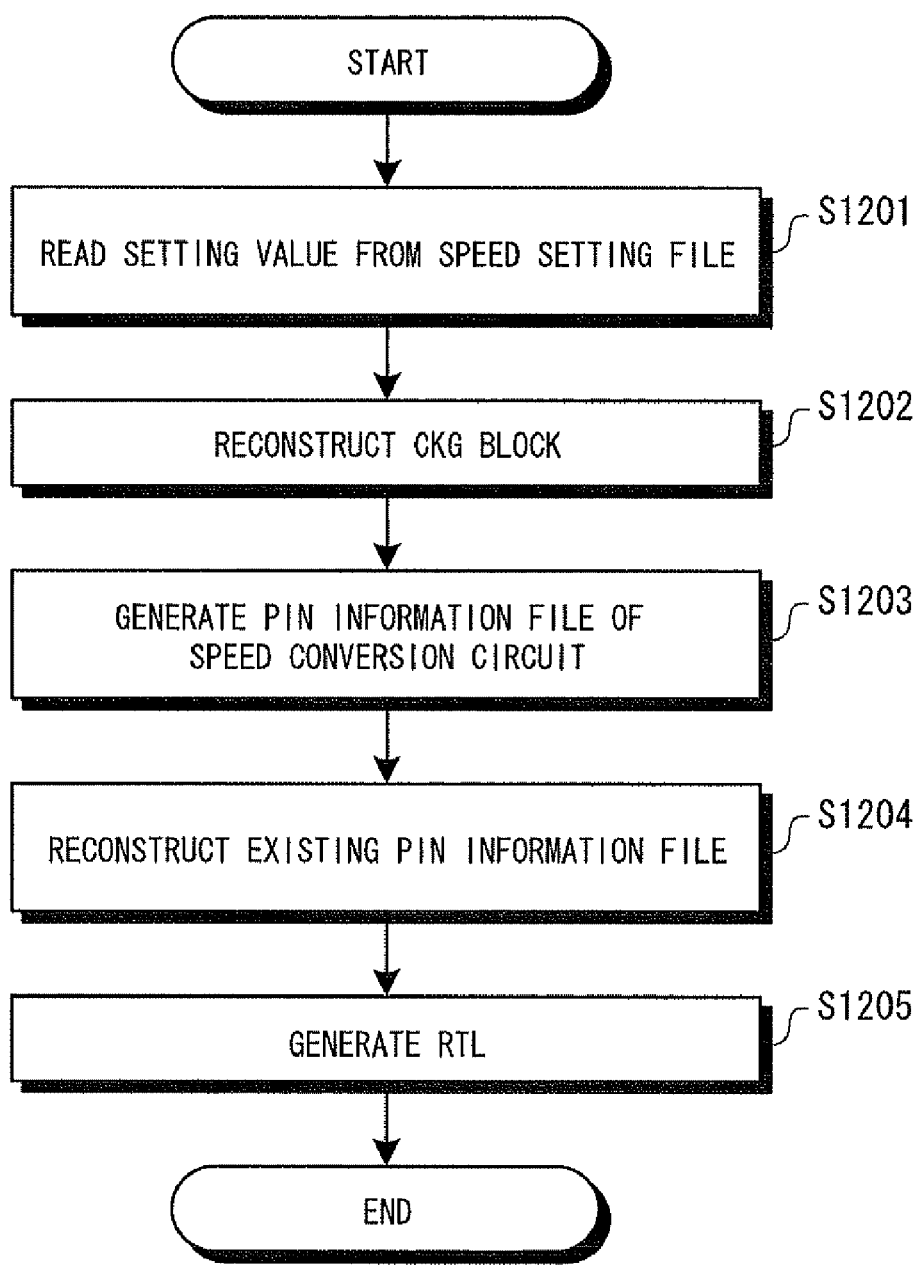
FIG. 12 is a flowchart illustrating a flow of RTL and a final result file generation processing.

Next, processing performed by the file information generating apparatus according to an embodiment is described with reference to FIGS. 10 to 12. FIG. 10 is a flowchart showing a main processing flow according to an embodiment. FIG. 11 is a flowchart showing a processing flow for generating a speed conversion circuit database according to an embodiment. FIG. 12 is a flowchart showing a processing flow for generating an RTL and a final result file according to an embodiment.[

First, a main processing flow according to an embodiment will be described with reference to FIG. 10. As shown in FIG. 10, an input of a pin information file prior to insertion of the speed conversion circuit block and/or an RTL prior to insertion of the speed conversion circuit block from the user is accepted via the input unit 11 (operation S1001). After accepting the input of the RTL, the file information generating apparatus 10 stands by to accept a request for inputting a setting value to a speed setting file (operation S1002).

Next, a request for a setting value input to the speed setting file from the user is accepted (operation S1002 affirmed). After accepting the setting value input request, the file information generating apparatus 10 reads the speed setting file from the speed setting file storage unit 14a and outputs/displays the same to the output unit 12. Then, an input of a setting value to the speed setting file from the user is accepted via the input unit 11. After accepting the input of the setting value, the speed setting file to which the setting value was inputted is stored in the speed setting file storage unit 13a. In addition to storing the speed setting file to the speed setting file storage unit 13a, the pin information file prior to the insertion of the speed conversion circuit block and the RTL prior to the insertion of the speed conversion circuit block for which an input has been accepted are respectively stored to the pin information file storage unit 13b or the RTL storage unit 13c (operation S1003).

After storing various input data (the speed setting file, the pin information file and the RTL file prior to the insertion of the speed conversion circuit block), the file information generating apparatus 10 verifies whether there is a problem with the input data. After verification, when there is no problem with the input data (operation S1004 negated), the file information generating apparatus 10 tentatively synthesizes an RTL from the input data (operation S1005). Next, verification is performed on whether there is a problem with the tentative synthesis (operation S1006). RTL tentative synthesis is performed using, for instance, a FPGA synthesis tool or the like for the purpose of verifying whether an RTL suitable for the actual circuit can be synthesized from the input data.

After verification, when there is no problem with the RTL tentative synthesis (operation S1006 negated), the file information generating apparatus 10 processes the pin information file according to statuses such as whether multiplexing or separation of connection terminals is required (operation S1007). Subsequently, the file information generating apparatus 10 sequentially executes speed conversion circuit database generation processing (operation S1008) and RTL and final result file generation processing (operation S1009) to be described in detail below. Processing result data including an RTL and a pin information file is stored (operation S1010) and outputted/displayed from the output unit 12 (operation S1011).

A description of operation S1002 will be given below. In operation S1002, when a request for inputting a setting value to the speed setting file has not been made (operation S1002 negated), the file information generating apparatus 10 proceeds to step S1004.

A description of operation S1004 given below. In operation S1004, when there is a problem with the input data (operation S1004 affirmed), the file information generating apparatus 10 inquires of the user (prompts the user) whether input data (e.g., data in the pin information file or the setting value data of the speed setting file) is to be changed (operation 1012). After the inquiry, when a response to the effect that input data will be changed (operation S1012 affirmed) and an input of change data is accepted (operation S1013), the file information generating apparatus 10 stores the change data for which input was accepted (operation S1003). On the other hand, after the inquiry, when there is no response to the effect that input data will be changed (operation S1012 negated), the file information generating apparatus 10 stores error information regarding the problematic input data as processing result data. The processing result data is stored (operation S1010) and, outputted/displayed from the output unit 12 (operation S1011).

Furthermore, a description of operation S1006 is given below. In operation S1006, when there is a problem with the RTL tentative synthesis (operation S1006 affirmed), the file information generating apparatus 10 stores error information on the RTL tentative synthesis as processing result data (operation S1010). The processing result data is stored and, outputted/displayed from the output unit 12 (operation S1011).

Speed Conversion Circuit Database Generation Processing

Next, with reference to FIG. 11, a flow of speed conversion circuit database generation processing according to an embodiment will be described. As shown in FIG. 11, pin information is extracted, for example, by the pin information file generating unit 14c which extracts connection terminal information of a connection terminal set as a speed conversion group from the pin information file storage unit 13b (operation S1101). The pin information file generating unit 14c uses the extracted connection terminal information to generate a speed conversion circuit database indicating a connection relationship of connection terminals in the speed conversion circuit block (operation S1102; refer to FIG. 9).

RTL and Final Result File Generation Processing

Next, with reference to FIG. 12, a flow of RTL and final result file generation processing according to an embodiment will be described. As shown in FIG. 12, a speed setting file is read, for example, by the CKG reconstruction unit 14b from the speed setting file storage unit 13a (operation S1201). The CKG reconstruction unit 14b then reconstructs the CKG block (operation S1202). More specifically, the CKG reconstruction unit 14b adds a new connection terminal in response to the insertion of the speed conversion circuit block. Together with the addition, the CKG reconstruction unit 14b generates a new clock corresponding to a setting value related to the clock condition and clock speed inputted to the speed conversion file (refer to FIG. 8) and reconfigures the CKG block.

A pin information file of the speed conversion circuit block is generated (operation S1203). For example, the pin information file generating unit 14c first extracts connection terminal information of a connection terminal set as a speed conversion group from the pin information file storage unit 13b. The pin information file generating unit 14c then uses the extracted connection terminal information to generate a speed conversion circuit database indicating a connection relationship of connection terminals in the speed conversion circuit block (refer to FIG. 9). After generation of the speed conversion circuit database, a pin information file of the speed conversion circuit block is generated based on the generated speed conversion circuit database. More specifically, first, the input and output directions within the speed conversion circuit database is reversed. Then, a connection terminal that is the same as the synchronous clock in the speed conversion circuit database is added. Together with this addition, the file information generating apparatus generates a pin information file of the speed conversion circuit block by adding a connection terminal newly added to the CKG block (refer to FIG. 5).

In addition, the pin information file generating unit 14c reconstructs the pin information file prior to the insertion of the speed conversion circuit block (the existing pin information file), which is stored in the pin information file storage unit 13b, while referencing the generated pin information file of the speed conversion circuit block (operation S1204). More specifically, a connection terminal heretofore connected to an interface block (e.g., "IF") is first changed to a connection terminal (e.g., "CLKC") newly added to the CKG block. Together with this change, the last connection source of the interface block is changed to a speed conversion block (refer to FIG. 5). Subsequently, the pin information file generating unit 14c stores each generated pin information file into the pin information file storage unit 13b.

An RTL is generated after the insertion of the speed conversion circuit block (operation S1205) and output of processing result data is provided. More specifically, the file output control unit 14d generates an RTL in which the speed conversion circuit block is inserted between the interface block and the CKG block reconstructed by the CKG reconstruction unit 14b based on the pin information file of the speed conversion circuit generated by the pin information file generating unit 14c and the pin information file prior to the insertion of the speed conversion circuit block which is reconstructed by the pin information file generating unit 14c (refer to FIG. 7). Next, the generated RTL is stored in the RTL storage unit 14c. The file output control unit 14d then outputs/displays the RTL after insertion of the speed conversion circuit block which is stored in the RTL storage unit 14c, the pin information file of the speed conversion circuit block which is stored in the pin information file storage unit 13b, and the reconstructed pin information file prior to the insertion of the speed conversion circuit block, as processing result data from the output unit 12.

As described above, by generating an RTL, an RTL including a speed conversion circuit block can be readily generated without requiring significant workload in each process and without occurrence(s) of backtracking due to connection errors and the like.

In addition, with the method and system according to an t embodiment, since a clock condition and a clock speed to be used by the speed conversion circuit block are variably set, it is now possible to obtain an RTL capable of operating internal circuits at a fast clock in accordance with external devices. Furthermore, it is also possible to obtain an RTL capable of operating internal circuits at a slow clock.

For the embodiment presented above, a case has been described where an RTL is generated in which a single speed conversion circuit block is inserted between an interface block and a clock circuit block. The present invention is not limited to a particular embodiment and may be arranged, for example, so that an RTL is generated for which a plurality of speed conversion circuit blocks are inserted between the interface block and the clock circuit block. Accordingly, a configuration of a file information generating apparatus according to another embodiment is described, followed by a description on the advantages thereof.

Configuration of a File Information Generating Apparatus

Figure 14:
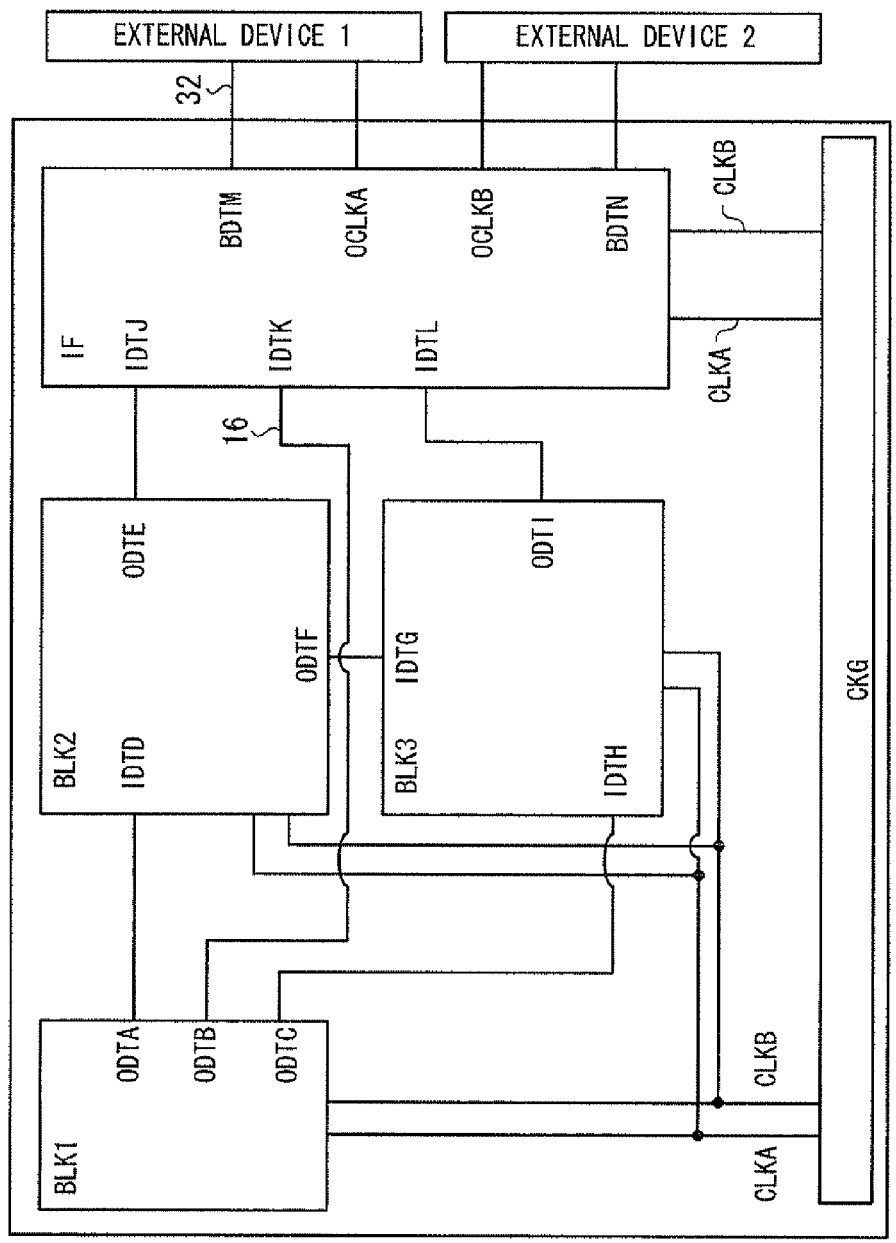
FIG. 14 is a diagram illustrating a configuration of an RTL prior to insertion of a speed conversion circuit block.
Figure 18:
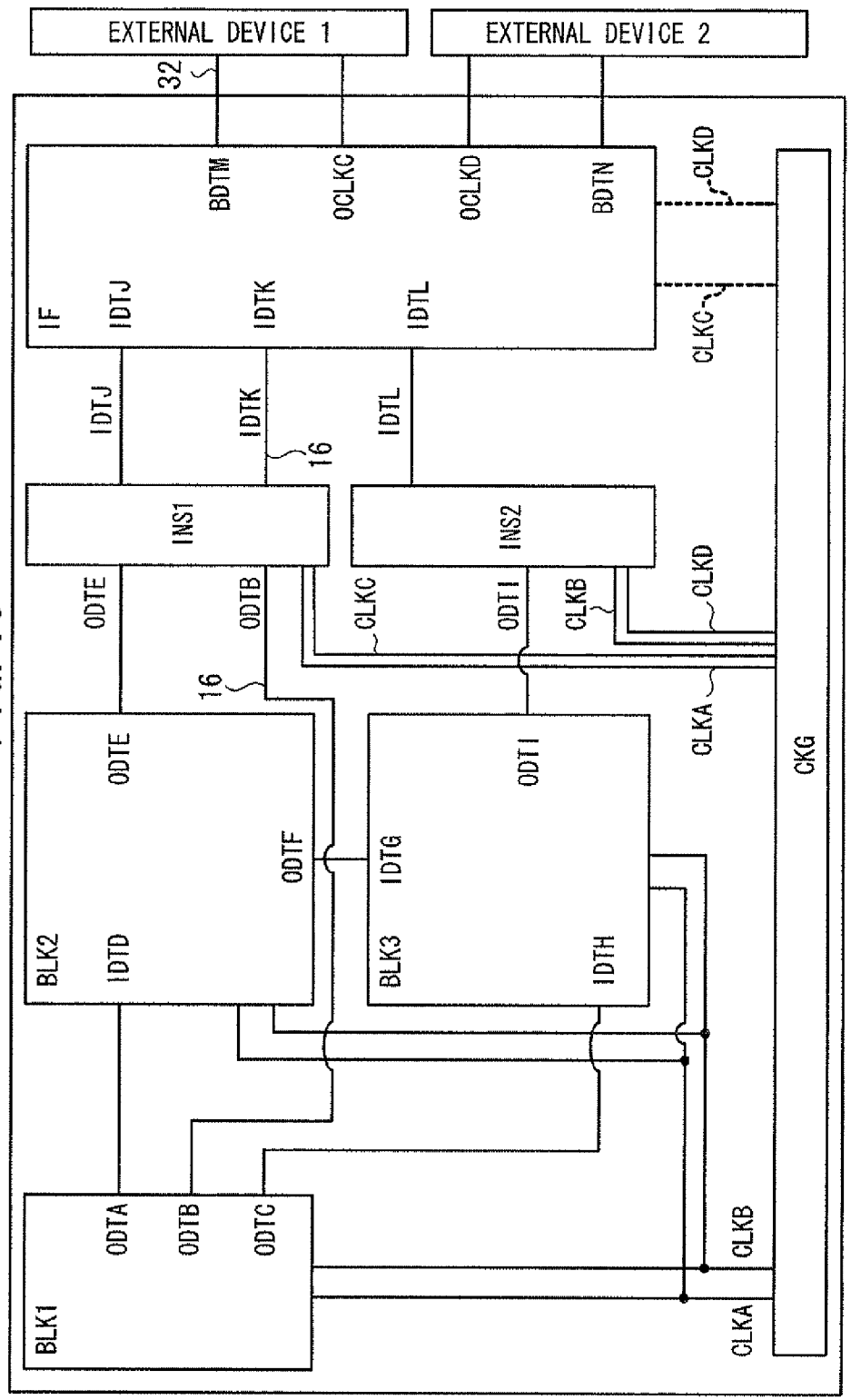
FIG. 18 is a diagram illustrating a configuration of an RTL after insertion of a speed conversion circuit block.

A configuration of the file information generating apparatus according to an embodiment is described with reference to FIGS. 13 to 18. FIG. 13 is a diagram showing a configuration example of a speed setting file according to an embodiment. FIG. 14 is a diagram showing a configuration example of an RTL prior to insertion of a speed conversion circuit block according to an embodiment. FIG. 15 is a diagram showing a configuration example of a pin information file prior to insertion of a speed conversion circuit block according to an embodiment. FIG. 16 is a diagram showing a configuration example of a speed conversion circuit database according to an embodiment. FIG. 17 is a diagram showing a configuration example of a pin information file after insertion of a speed conversion circuit block according to an embodiment. FIG. 18 is a diagram showing a configuration example of an RTL after insertion of a speed conversion circuit block according to an embodiment.

As was the case in the embodiment described above, the data input acceptance unit 14a first accepts (receives) an input of a pin information file prior to the insertion of a speed conversion circuit block or an RTL prior to the insertion of the speed conversion circuit block from the user via the input unit 11. Subsequently, the data input acceptance unit 14a stands by to accept a request for inputting a setting value to the speed conversion file. After accepting a setting value input request from the user and outputting/displaying a speed setting file, the data input acceptance unit 14a accepts input of a setting value to the speed setting file from the user via the input unit 11. Thereafter, the speed setting file including the setting value is stored in the speed setting file storage unit 13a and is also stored in the pin information file storage unit 13b or the RTL storage unit 13c.

At this point, in the case where a plurality of speed conversion circuit blocks are inserted between the interface block and the clock circuit block, as exemplified in FIG. 13, the speed setting file storage unit 13a is configured so as to respectively store setting values for which input is accepted from the user for each of the speed conversion circuit block in association with respective setting items such as clock condition and clock speed. The pin information file storage unit 13b stores a pin information file prior to insertion of a speed conversion circuit block for which each speed conversion circuit block to be inserted is set as a separate speed conversion group ("1" or "2") (refer to FIG. 15). The RTL storage unit 13c stores an RTL prior to the insertion of a speed conversion circuit block (refer to FIG. 14).

In addition, the CKG reconstruction unit 14b reconstructs the CKG block in association with the insertion of each speed conversion circuit block. In a manner that is basically the same as described for the above embodiment, the CKG reconstruction unit 14b reads a speed setting file from the speed setting file storage unit 13a. The CKG reconstruction unit 14b then respectively adds a new connection terminal in response to the insertion of each speed conversion circuit block. Together with the addition, the CKG reconstruction unit 14b respectively generates a new clock corresponding to each setting value related to the clock condition and clock speed respectively inputted to the speed conversion file and reconfigures the CKG block (refer to FIG. 18).

In addition, the pin information file generating unit 14c generates a pin information file of the speed conversion circuit block and reconstructs the pin information file prior to the insertion of the speed conversion circuit block. In a manner that is basically the same as that described for the above embodiment, the pin information file generating unit 14c respectively extracts, for each speed conversion group, connection terminal information of a connection terminal set as a speed conversion group from the pin information file storage unit 13b. Using each extracted connection terminal information, the file information generating apparatus respectively generates a speed conversion circuit database indicating a connection relationship of connection terminals in each speed conversion circuit block (refer to FIG. 16).

Next, based on the respective generated speed conversion circuit databases, the pin information file generating unit 14c respectively generates a pin information file of each speed conversion circuit block. In a manner that is basically the same as described for the above embodiment, for the pin information file of each speed conversion circuit block, the file information generating apparatus reverses the input/output directions in the speed conversion circuit database and adds a connection terminal that is the same as a synchronous clock in the speed conversion circuit database. Together with the addition, the pin information file generating unit 14c generates a pin information file of the speed conversion circuit block by adding a connection terminal (e.g., "CLKC" and "CLKD") that is newly added to the CKG block (refer to FIG. 17).

In addition, the pin information file generating unit 14c reconstructs the pin information file prior to the insertion of each speed conversion circuit block while referencing the pin information file of each generated speed conversion circuit block. In a manner that is basically the same as that described for the above embodiment, a connection terminal heretofore connected to an interface block (e.g., "IF") is changed to a connection terminal (e.g., "CLKC" and "CLKD") newly added to the CKG block. Together with this change, the last connection source of the interface block is changed to each speed conversion block (e.g., "INS1" and "INS2") (refer to FIG. 17). After reconstruction of the pin information file prior to the insertion of the speed conversion circuit block, the pin information file generating unit 14c respectively stores the generated pin information file into the pin information file storage unit 13b.

Furthermore, in the same manner as described for the above embodiment, the file output control unit 14d generates an RTL in which each speed conversion circuit block is inserted between the interface block and the CKG block reconstructed by the CKG reconstruction unit 14b based on the pin information file of each speed conversion circuit generated by the pin information file generating unit 14c and the pin information file prior to the insertion of the speed conversion circuit block which is reconstructed by the pin information file generating unit 14c (refer to FIG. 18), and stores the RTL in the RTL storage unit 14c. The file output control unit 14d outputs/displays the RTL after insertion of each speed conversion circuit block which is stored in the RTL storage unit 14c, the pin information file of each speed conversion circuit block which is stored in the pin information file storage unit 14b and the reconstructed pin information file prior to the insertion of each speed conversion circuit block as processing result data from the output unit 12. As described above, according to the this embodiment, in the case where a plurality of speed conversion circuit blocks are to be inserted between the interface block and the CKG block, clock information regarding the clock condition and clock speed used in each conversion circuit block is respectively set. Subsequently, based on each set clock information, CKG blocks respectively including a new clock for accommodating the insertion of each speed conversion circuit block are reconstructed. Then, connection terminal information indicating a connection relationship of connection terminals in the circuit structure and information in which connection terminals requiring connection speed conversion in response to the insertion of the speed conversion circuit block are respectively set as a separate speed conversion block for each inserted speed conversion circuit block are associated with each other and stored in the storage unit. Next, connection terminal information of connection terminals set as separate speed conversion groups is respectively extracted from the storage unit. Using each extracted connection terminal information, speed conversion circuit databases indicating the connection relationship of connection terminals in each speed conversion circuit block are respectively generated. Based on each generated speed conversion circuit database, connection terminal information on the reconstructed connection relationship of the connection terminals in the circuit structure is respectively generated. Subsequently, based on each connection terminal information generated by reconstructing the connection relationship of the connection terminals in the circuit structure, RTLs in which the speed conversion circuit blocks are respectively inserted between the reconstructed CKG block and the interface block are generated. Consequently, for example, even in the case where a plurality of speed conversion circuit blocks are to be inserted in correspondence to a plurality of external device blocks, the disclosed system and method are enabled to readily generate file information described in RTL including the speed conversion circuit block without requiring significant workload in each process and without occurrence(s) of backtracking due to connection errors and the like.

Furthermore, a RTL is generated which includes a speed conversion block so as to correspond to an external device block. As a result, it is possible to generate an RTL capable of flexibly changing connection speeds of an external device and internal circuits. Moreover, when performing a real-life evaluation of a prototype system created based on the RTL, such an evaluation can now be performed while operating the external device at actual speed because the connection speeds of an external device and internal circuits can be changed flexibly.

In addition to the above-described embodiments, the present invention may be implemented in various different forms. Accordingly, other embodiments included in the present invention will now be described.

The respective components of the file information generating apparatus 10 shown in FIG. 2 represent conceptual functions. As such, the components need not necessarily be configured as illustrated. In other words, the specific forms of distribution/integration of the file information generating apparatus 10 need not be limited to those depicted in FIG. 2. For example, the file information generating apparatus 10 may be configured so that the entirety or portions thereof are functionally or physically distributed/integrated in arbitrary or specialized units according to various load and usage states, including distributing the file output control unit 14b among an RTL generating function and a file output control function. In addition, the entirety or an arbitrary portion of the respective processing functions performed by the file information generating apparatus 10 may be realized by a CPU and programs analyzed and executed by the CPU, or may otherwise be realized as hardware employing wired logic.

Figure 19:
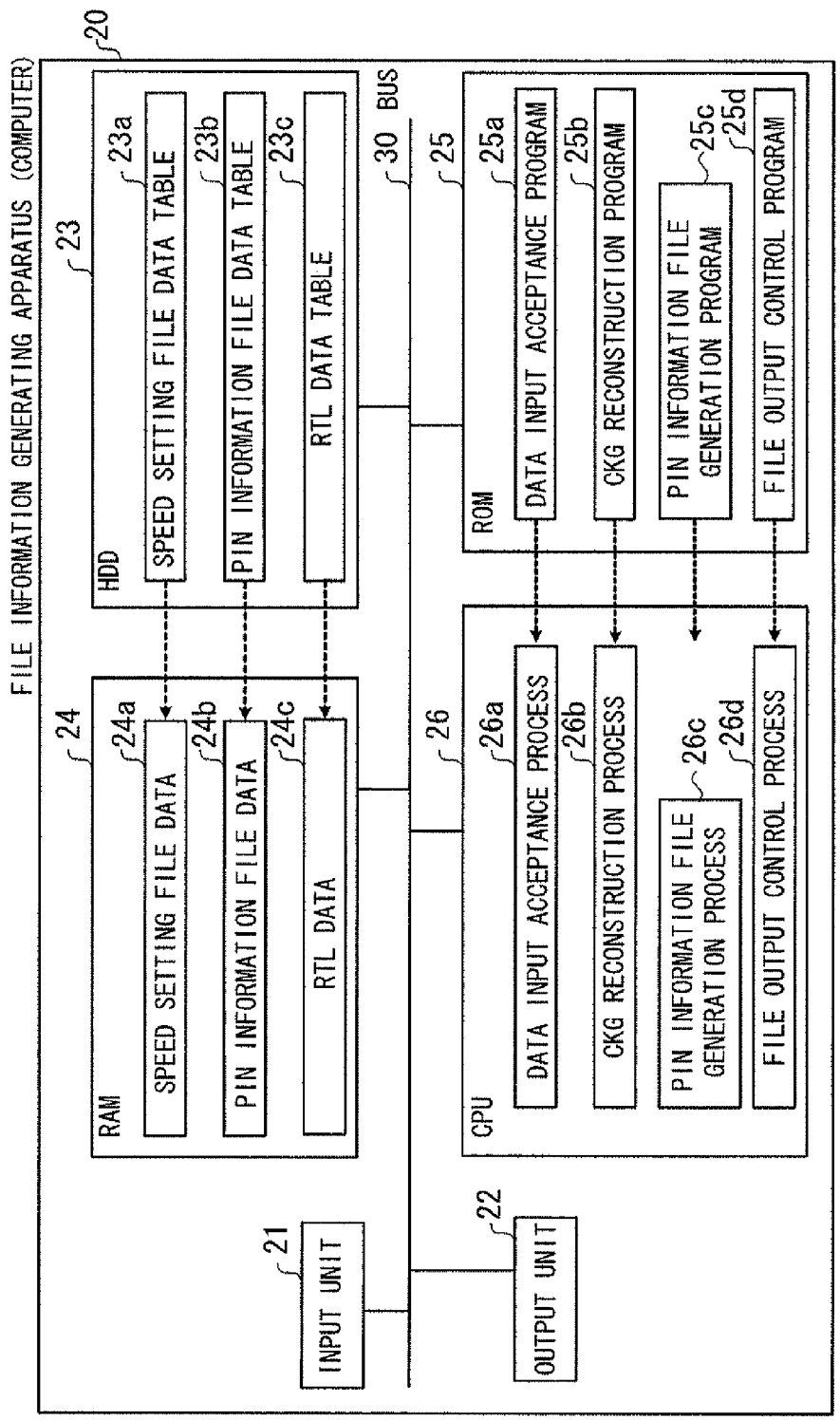
FIG. 19 is a diagram illustrating a computer that executes a file information generation program.

Various processing described in the embodiments above (for example, refer to FIGS. 10 to 12) can be realized by executing a program prepared in advance on a computer system such as a personal computer or a workstation. An example of a computer that executes a file information generation program having the same functions as the above-described embodiments is described below with reference to FIG. 19. FIG. 19 is a diagram showing a computer that executes a file information generation program.

As shown in FIG. 19, a computer 20 as a file information generating apparatus is configured such that an input unit 21, an output unit 22, an HDD 23, a RAM 24, a ROM 25 and a CPU 26 are connected by a bus 30. The input unit 21 and the output unit 22 respectively correspond to the input unit 11 and the output unit 12 of the file information generating apparatus 10 shown in FIG. 3.

In addition, a file information generation program that fulfills the same functions as the file information generating apparatus presented in the embodiment discussed above is stored in advance in the ROM 25. In other words, as shown in FIG. 19, a data input acceptance program 25a, a CKG reconstruction program 25b, a pin information file generation program 25c and a file output control program 25d are stored in advance in the ROM 25. In a similar manner as the respective components of the file information generating apparatus 10 shown in FIG. 2, the programs 25a, 25b, 25c and 25d may be integrated or distributed as appropriate. The ROM 25 may be replaced with a non-volatile "RAM".

The CPU 26 reads the programs 25a, 25b, 25c and 25d from the ROM 25 and executes the programs. Through this execution, as shown in FIG. 19, the respective programs implement process(es) including a data input acceptance process 26a, a CKG reconstruction process 26b, a pin information file generation process 26c and a file output control process 26d. Each of the processes 26a, 26b, 26c and 26d respectively corresponds to the data input acceptance unit 14a, the CKG reconstruction unit 14b, the pin information file generating unit 14c and the file output control unit 14d of the file information generating apparatus 10 shown in FIG. 2.

In addition, as shown in FIG. 19, a speed setting file data table 23a, a pin information file data table 23b and an RTL data table 23c are respectively stored in the HDD 23. The speed setting file data table 23a corresponds to the speed setting file storage unit 13a shown in FIG. 2. The pin information file data table 23b corresponds to the pin information file storage unit 13b shown in FIG. 2. The RTL data table 23c corresponds to the RTL storage unit 13c shown in FIG. 2. Next, the CPU 26 respectively reads speed setting file data 24a, pin information file data 24b and RTL data 24c from the speed setting file data table 23a, the pin information file data table 23b and the RTL data table 23c, and stores the date in the RAM 24. Subsequently, the CPU 26 executes processing based on the speed setting file data 24a, pin information file data 24b and RTL data 24c stored in the RAM 24.

It should be noted that the respective programs 25a, 25b, 25c and 25d described above need not necessarily be stored in advance in the ROM 25. For example, the programs may be alternatively stored in a "portable physical medium" such as a flexible disk (FD), a CD-ROM, a DVD disk, a magnetooptic disk, an IC card, or the like to be inserted into the computer 20, or a "fixed physical medium" such as an HDD internally or externally provided at the computer 20. Furthermore, the respective programs may be arranged so as to be stored in "another computer (or server)" connected to the computer 20 via public lines, the Internet, a LAN, a WAN, or the like, whereby the computer 20 reads and executes the respective programs.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of generating file information in which a circuit structure including an interface block, a speed conversion circuit block and a functional circuit block is described in RTL, the method comprising:

setting clock information regarding a clock condition and a clock speed to be used by the speed conversion circuit block for insertion between the interface block to be connected to an external device block and a clock circuit block;

reconstructing the clock circuit block including a new clock for accommodating the insertion of the speed conversion circuit block based on the clock information set;

associating connection terminal information indicating a connection relationship of connection terminals in the circuit structure with speed conversion object information having set, as a speed conversion object, a connection terminal requiring connection speed conversion in response to the insertion of the speed conversion circuit block, and storing the speed conversion object information in a storage unit;

extracting, based on the speed conversion object information stored, the connection terminal information of the connection terminal set as the speed conversion object from the storage unit;

generating speed conversion circuit information indicating a connection relationship of the connection terminals in the speed conversion circuit block using the connection terminal information extracted;

generating connection terminal information having the connection relationship of the connection terminals in the circuit structure reconstructed based on the speed conversion circuit information generated; and generating file information in which the speed conversion circuit block is inserted between the clock circuit block and the interface block based on said reconstructing of the clock circuit block and the connection terminal information generated.

2. The file information generating method according to claim 1, comprising:

variably setting the clock condition and the clock speed to be used by the speed conversion circuit block.

3. The file information generating method according to claim 2, comprising:

setting the clock condition and the clock speed to be used by the speed conversion circuit block so as to respectively correspond to a case where a fast clock is set to the speed conversion circuit block or a case where a slow clock is set to the speed conversion circuit block.

4. The file information generating method according to claim 1, wherein a plurality of speed conversion circuit blocks are inserted between the interface block and the clock circuit block, the method comprises:

setting clock information regarding a clock condition and a clock speed to be used by each speed conversion circuit block;

reconstructing clock circuit blocks respectively including a new clock for accommodating the insertion of each speed conversion circuit block based on each clock information set in said setting of clock information;

associating connection terminal information indicating a connection relationship of connection terminals in the circuit structure with respective speed conversion object information having set, as a separate speed conversion object for each inserted speed conversion circuit block, a connection terminal requiring connection speed conversion in response to the insertion of the speed conversion circuit block, and storing each speed conversion object information in a storage unit;

respectively extracting, based on each speed conversion object information stored, the connection terminal information of the connection terminal set as the speed conversion object from the storage unit, and respectively generating speed conversion circuit information indicating a connection relationship of connection terminals in each speed conversion circuit block using each extracted connection terminal information;

respectively generating connection terminal information having the connection relationship of the connection terminals in the circuit structure reconstructed based on each generated speed conversion circuit information; and generating file information in which each speed conversion circuit block is respectively inserted between the clock circuit block reconstructed in a clock circuit block reconstruction and the interface block based on each connection terminal information generated by reconstructing the connection relationship of the connection terminals in the circuit structure.

5. An apparatus generating file information in which a circuit structure including an interface block, a speed conversion circuit block and a functional circuit block is described in RTL, the apparatus comprising:

a speed conversion circuit block provided between an interface block to be connected to an external device block and a clock circuit block;

a clock information setting unit that sets clock information regarding a clock condition and a clock speed to be used by the speed conversion circuit block;

a clock circuit block reconstruction unit that reconstructs the clock circuit block including a new clock for accommodating insertion of the speed conversion circuit block based on the clock information set by the clock information setting unit;

a connection terminal information storage unit that associates connection terminal information indicating a connection relationship of connection terminals in the circuit structure with speed conversion object information having set, as a speed conversion object, a connection terminal requiring connection speed conversion in response to the insertion of the speed conversion circuit block, and stores the speed conversion object information;

a connection terminal information extracting unit that extracts, based on the speed conversion object information stored by the connection terminal information storage unit, the connection terminal information of the connection terminal set as the speed conversion object;

a speed conversion circuit information generating unit that generates speed conversion circuit information indicating a connection relationship of connection terminals in the speed conversion circuit block using the connection terminal information extracted by the connection terminal information extracting unit, a connection terminal information generating unit that generates connection terminal information having the connection relationship of the connection terminals in the circuit structure reconstructed based on the speed conversion circuit information generated by the speed conversion circuit information generating unit; and a file information generating unit that generates file information in which the speed conversion circuit block is inserted between the clock circuit block reconstructed by the clock circuit block reconstruction unit and the interface block based on connection terminal information generated by the connection terminal information generating unit by reconstructing the connection relationship of the connection terminals in the circuit structure.

6. The file information generating apparatus according to claim 5, wherein the clock information setting unit variably sets the clock condition and the clock speed to be used by the speed conversion circuit block.

7. The file information generating apparatus according to claim 6, wherein the clock information setting unit sets the clock condition and the clock speed to be used by the speed conversion circuit block so as to respectively correspond to a case where a fast clock is set to the speed conversion circuit block or a case where a slow clock is set to the speed conversion circuit block.

8. The file information generating apparatus according to claim 5, wherein a plurality of speed conversion circuit blocks are inserted between the interface block and the clock circuit block, and the clock information setting unit respectively sets clock information regarding a clock condition and a clock speed to be used by each speed conversion circuit block;

the clock circuit block reconstruction unit reconstructs clock circuit blocks respectively including a new clock for accommodating the insertion of each speed conversion circuit block based on each clock information set by the clock information setting unit;

the connection terminal information storage unit associates connection terminal information indicating a connection relationship of connection terminals in the circuit structure with respective speed conversion object information having set, as a separate speed conversion object for each inserted speed conversion circuit block, a connection terminal requiring connection speed conversion in response to the insertion of the speed conversion circuit block, and stores the each speed conversion object information;

the speed conversion circuit information generating unit respectively extracts, based on each speed conversion object information stored by the connection terminal information storage unit, the connection terminal information of the connection terminal set as the speed conversion object from connection terminal information stored, and respectively generates speed conversion circuit information indicating a connection relationship of connection terminals in each speed conversion circuit block using each extracted connection terminal information;

the connection terminal information generating unit respectively generates connection terminal information having the connection relationship of the connection terminals in the circuit structure reconstructed based on each speed conversion circuit information generated by the speed conversion circuit information generating unit; and the file information generating unit generates file information in which each speed conversion circuit block is respectively inserted between the clock circuit block reconstructed and the interface block based on each connection terminal information generated by the connection terminal information generating unit by reconstructing the connection relationship of the connection terminals in the circuit structure.

9. A computer readable storage medium storing a file information generation program that causes a computer to execute operations including generating file information in which a circuit structure including an interface block, a speed conversion circuit block and a functional circuit block is described in RTL, said operations comprising:

setting clock information regarding a clock condition and a clock speed to be used by the speed conversion circuit block for insertion between the interface block to be connected to an external device block and a clock circuit block;

reconstructing a clock circuit block including a new clock for accommodating the insertion of the speed conversion circuit block based on the clock information set;

associating connection terminal information indicating a connection relationship of connection terminals in the circuit structure with speed conversion object information having set, as a speed conversion object, a connection terminal requiring connection speed conversion in response to the insertion of the speed conversion circuit block, and stores the speed conversion object information;

extracting, based on the speed conversion object information stored, connection terminal information of the connection terminal set as the speed conversion object;

generating speed conversion circuit information indicating a connection relationship of connection terminals in the speed conversion circuit block using the connection terminal information extracted;

generating a connection terminal information having the connection relationship of the connection terminals in the circuit structure reconstructed based on the speed conversion circuit information generated; and generating file information in which the speed conversion circuit block is inserted between the clock circuit block reconstructed and the interface block based on the connection terminal information generated.

10. The storage medium storing the file information generation program according to claim 9, wherein the clock condition and the clock speed to be used by the speed conversion circuit block are variably set.

11. The storage medium storing the file information generation program according to claim 9, wherein a plurality of speed conversion circuit blocks are inserted between the interface block and the clock circuit block, and respectively setting clock information regarding a clock condition and a clock speed to be used by each speed conversion circuit block;

reconstructing clock circuit blocks respectively including a new clock for accommodating the insertion of each speed conversion circuit block based on each clock information set by said setting of the clock information;

associating connection terminal information indicating a connection relationship of connection terminals in the circuit structure with respective speed conversion object information having set, as a separate speed conversion object for each inserted speed conversion circuit block, a connection terminal requiring connection speed conversion in response to the insertion of the speed conversion circuit block, and stores the each speed conversion object information;

respectively extracting, based on each speed conversion object information stored, the connection terminal information of the connection terminal set as the speed conversion object from connection terminal information stored, and respectively generating speed conversion circuit information indicating a connection relationship of connection terminals in each speed conversion circuit block using each extracted connection terminal information;

respectively generating connection terminal information in which the connection relationship of the connection terminals in the circuit structure is reconstructed based on each speed conversion circuit information generated; and generating file information in which each speed conversion circuit block is respectively inserted between the clock circuit block reconstructed and the interface block based on each connection terminal information generated by reconstructing the connection relationship of the connection terminals in the circuit structure.

* * * * *